(12) United States Patent
Ibarra Garcés et al.

(10) Patent No.: US 10,940,548 B2
(45) Date of Patent: Mar. 9, 2021

(54) MACHINE FOR MACHINING WORKPIECES

(71) Applicant: ETXE-TAR, S.A., Elgoibar (ES)

(72) Inventors: Jorge Ibarra Garcés, Elgoibar (ES); Amaiur Atutxa Ocerin, Elgoibar (ES); Iñaki Escudero Olaciregui, Elgoibar (ES); Patxi Eceiza Agote, Elgoibar (ES)

(73) Assignee: ETXE-TAR, S.A., Elgoibar (ES)

( * ) Notice: Subject to any disclaimer, the term of this patent is extended or adjusted under 35 U.S.C. 154(b) by 0 days.

(21) Appl. No.: 16/311,591

(22) PCT Filed: May 30, 2017

(86) PCT No.: PCT/EP2017/062950
§ 371 (c)(1),
(2) Date: Dec. 19, 2018

(87) PCT Pub. No.: WO2017/220290
PCT Pub. Date: Dec. 28, 2017

(65) Prior Publication Data
US 2019/0201988 A1    Jul. 4, 2019

(30) Foreign Application Priority Data
Jun. 20, 2016 (ES) .................. 16382286.9

(51) Int. Cl.
*B23C 3/06* (2006.01)
*B23Q 1/60* (2006.01)
(Continued)

(52) U.S. Cl.
CPC .................. *B23C 3/06* (2013.01); *B23B 5/18* (2013.01); *B23D 37/005* (2013.01); *B23Q 1/605* (2013.01);
(Continued)

(58) Field of Classification Search
CPC .... B23B 5/18; B23B 5/22; B23B 5/42; B23B 41/06; B23C 2220/68; B23C 3/06; B23Q 1/605; B23Q 1/75; B23Q 39/026
See application file for complete search history.

(56) References Cited

U.S. PATENT DOCUMENTS 3,366,012 A * 1/1968 Richter .............. B23Q 11/0825
409/134
3,795,161 A * 3/1974 Berbalk ................... B23C 3/06
82/106
(Continued)

FOREIGN PATENT DOCUMENTS

| CN | 204545533 U | 8/2015 |
|---|---|---|
| EP | 1193027 A2 | 4/2002 |

(Continued)

OTHER PUBLICATIONS

International Search Report dated Sep. 22, 2017 re: Application No. PCT/EP2017/062950, pp. 1-3, citing: EP 1 466 684 A1, FR 2 438 517 A1 and EP 1 193 027 A2.
(Continued)

*Primary Examiner* — Nicole N Ramos
(74) *Attorney, Agent, or Firm* — Cantor Colburn LLP

(57) ABSTRACT

A machine for machining workpieces, including a first column and a second column facing each other according to a first horizontal axis, a guide system guided displacement of at least one of the columns in parallel with the first horizontal axis, one or two tool units, each tool unit being arranged on respective column for controlled displacement perpendicularly to the first horizontal axis, on each column, a workpiece holding device, at least one of the workpiece holding devices being arranged for controlled displacement in parallel with the first horizontal axis, where the workpiece holding devices are arranged for supporting a workpiece
(Continued)

between them and for controlled rotation of the workpiece around a workpiece axis parallel with the first horizontal axis.

15 Claims, 23 Drawing Sheets

(51) Int. Cl.
  *B23D 37/00* (2006.01)
  *B23B 5/18* (2006.01)
  *B23Q 39/02* (2006.01)
(52) U.S. Cl.
  CPC ........ *B23Q 39/026* (2013.01); *B23C 2220/68* (2013.01)

(56) References Cited

U.S. PATENT DOCUMENTS

| | | | |
|---|---|---|---|
| 3,965,780 A | 6/1976 | Yamada | |
| 4,110,055 A * | 8/1978 | Blaimschein | B23C 3/06 144/252.1 |
| 4,208,156 A | 6/1980 | Blaimschein et al. | |
| 4,305,689 A | 12/1981 | Yamade et al. | |
| 4,326,323 A * | 4/1982 | Kralowetz | B23C 3/06 29/6.01 |
| 5,078,556 A | 1/1992 | Schrod et al. | |
| 5,168,609 A * | 12/1992 | Kojima | B23B 3/06 29/27 R |
| 7,032,484 B2 * | 4/2006 | Kobayashi | B23B 3/168 82/117 |
| 7,179,029 B2 | 2/2007 | Hemming et al. | |
| 8,555,756 B2 * | 10/2013 | Arana Beobide | B23Q 17/2291 82/1.11 |
| 9,421,616 B2 * | 8/2016 | Walz | B23B 29/242 |

FOREIGN PATENT DOCUMENTS

| | | |
|---|---|---|
| EP | 1466684 A1 | 10/2004 |
| FR | 2438517 A1 | 5/1980 |
| RU | 2560478 C2 | 8/2015 |
| RU | 2567636 C2 | 11/2015 |
| WO | 2004007131 A1 | 1/2004 |

OTHER PUBLICATIONS

Written Opinion dated Sep. 22, 2017 re: Application No. PCT/EP2017/062950, pp. 1-5, citing: EP 1 466 684 A1.

* cited by examiner

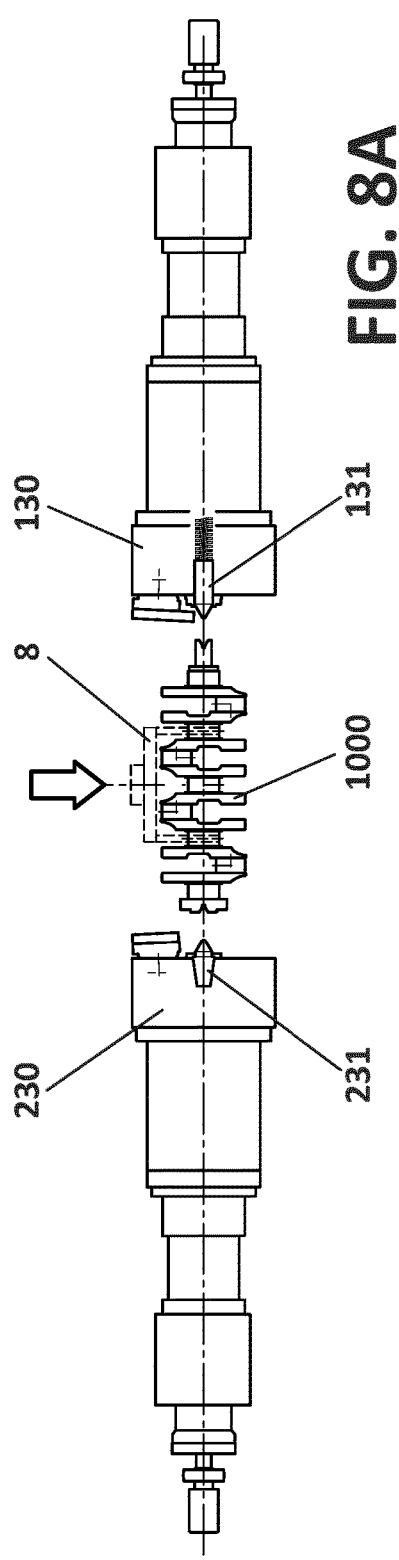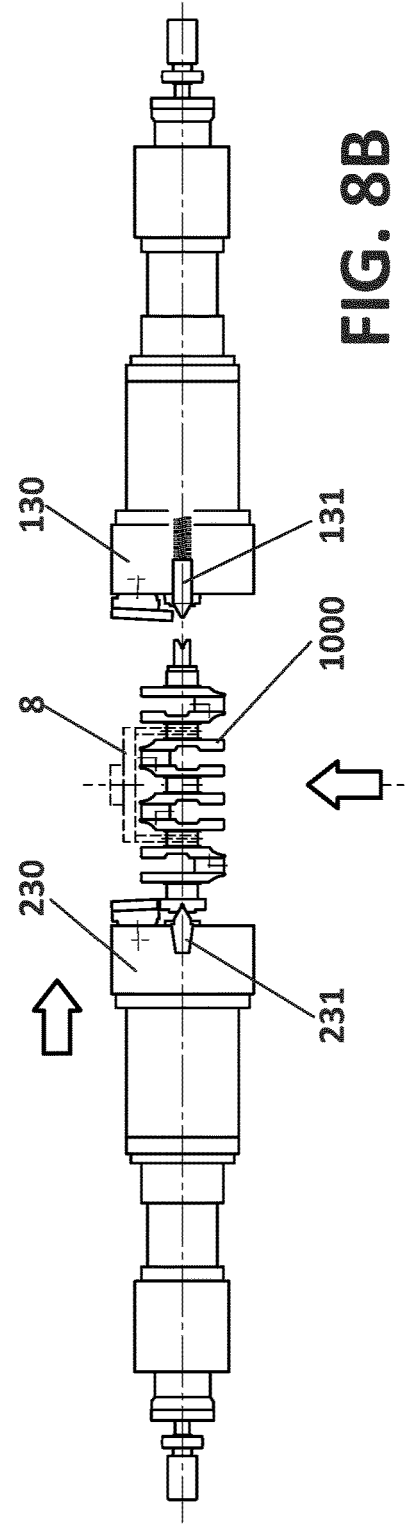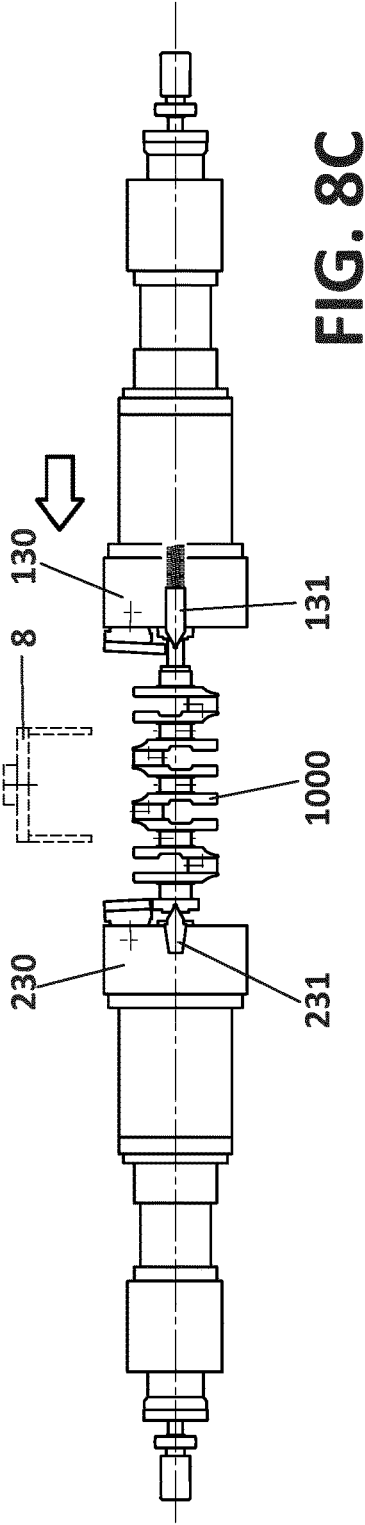

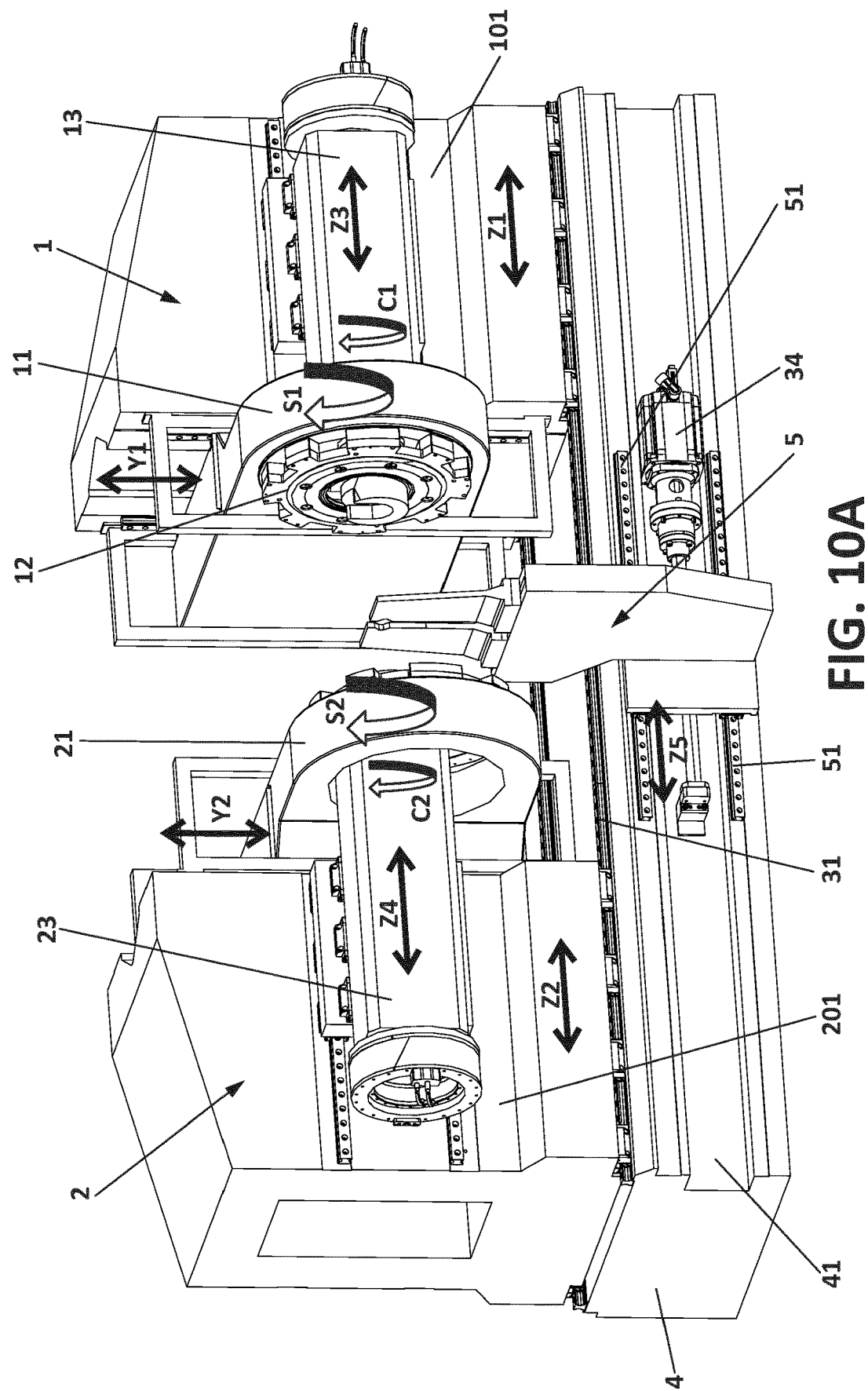

MACHINE FOR MACHINING WORKPIECES

TECHNICAL FIELD

The present disclosure relates to the field of machines for machining workpieces, such as by milling or turn-turn-broaching.

BACKGROUND

Machines for machining workpieces such as by milling or turn-turn-broaching typically involve one or more rotatably arranged tools and means for supporting one or more workpieces. The machines are typically arranged for providing a relative movement between the workpiece and one or more tools, sometimes including a rotary movement of the workpiece. The relative movement is sometimes produced by displacing the workpiece, and sometimes by displacing the tool or tools, and sometimes by displacing both workpiece and tools. Many different machine layouts are known in the art, and generally involve different advantages and disadvantages in terms of, for example, flexibility, productivity, accessibility (such as for maintenance, repair, adaptation to different kinds of operations and/or workpieces), chip removal, risk of jamming (for example, due to accumulation of chips), dimensions, weight, cost, etc.

For example, U.S. Pat. No. 4,305,689-A discloses a machine for the machining of crankshafts using internal milling cutters. The machine comprises a pair of rails secured to a bed, tool supports arranged to be displaced along the rails, and chucks to support the ends of the crankshaft. Also the chucks are understood to be supported so that they can be displaced along the same rails. Now, the tool supports that accommodate the internal milling cutters are provided between the chuck supports and are movable along the same guide rails on which the chuck supports are guided, in the direction of the axis of the crankshaft. The steady-rest is also guided on the same pair of rails. This prior art arrangement, in which both the tool supports, the headstocks with their chucks and the steady-rest are arranged aligned with each other on the same guide rails, has been found to involve certain problems:

Once the crankshaft is supported by the chucks, the space between the bases of the chuck supports and the base of the steady rest is very limited, at least in the case of relatively short crankshafts, such as those used in automobiles and trucks. Thus, for the tools to be able to act on all the portions of the crankshafts that have to be machined, the bases of the carriages supporting the tools have to be relatively short in the longitudinal direction, so as to allow each tool carriage to be displaced sufficiently in relation to the crankshaft so that the tool can interact with all the relevant portions of the crankshaft, without interfering with the other tool carriage—there are two of them—and without interfering with the headstocks or the steady-rest. This problem is even bigger when two tools are to operate on the crankshaft simultaneously, which is often preferred for productivity reasons. Now, this narrow design of the bases of the carriages that support the tools, that is, their short extension in the direction parallel with the rails along which they move, implies a reduced twisting and tilting stiffness. This may have a negative impact on the precision of the machining, on the surface quality, on productivity, and even on tool service life.

The chucks extend a substantial distance from their supports, in an overhanging manner. This is necessary in order to allow the chucks to axially extend through the internal milling cutters so that the chucks can be accessed for loading and unloading crankshafts, and also to allow the internal milling cutters to access all the parts of the crankshaft that have to be machined, also close to the ends thereof, without the carriages supporting the tools interfering with the supports of the chucks. The way in which the chucks extend from their supports in an overhanging manner produces a cantilever effect, further reducing the stiffness of the system, a stiffness that is especially preferred in view of the high cutting forces exerted on the crankshaft during the rough milling operations.

A further problem involved with the arrangement known from U.S. Pat. No. 4,305,689-A is that as the tools and crankshaft are arranged above the guide rails, the metal chips that are removed from the crankshaft tend to fall down towards the rails. To protect the rails from the hot chips, protective covers may have to be placed on top of the rails. The use of such covers, such as telescopic covers, is known in the art. However, the use of them in this kind of machine is difficult, as the covers would have to fit into the relatively reduced space between the bases of the tool carriages, the bases of the supports of the chucks, and the base of the steady-rest. Even using telescopic covers, it would be difficult to fit them into the space between the moveable elements so as to allow these elements to move to all the positions they would have to occupy in order to machine all the relevant parts of the crankshaft; this issue can be especially problematic in situations in which the two internal milling cutters operate simultaneously on parts of the crankshaft that are relatively close to each other in the axial direction. This could imply a risk that rails would end up not being adequately protected from falling chips. If this risk exists, modern roller bearing linear guides cannot be used; instead, old-fashioned friction sliding guides would have to be used. Metal chips removed from the workpiece could fall directly down on the sliding guides, causing instant, non-uniform and frequent heating of the guides, which would tend to deteriorate the guides, something that is not desirable, especially not in a machine for precision machining. Chip accumulation and nesting can also end up interrupting the operation of the machine.

Internal milling cutters are generally manually exchanged, and exchange thereof normally takes place rather frequently. The configuration of the machine disclosed in U.S. Pat. No. 4,305,689-A does not facilitate replacement of the internal milling cutters and it is not ergonomic: in order to access the internal milling cutters, the operator has to step up on the guide system, where chips and swarf accumulate and nest; additionally, the means to release tools are relatively close to the surface of the guide system, so that the operator would have to handle heavy loads in non-ergonomic positions, such as bending over or kneeling.

Also when there is a disruption in the operation of the machine due to a failure, the operator would have to access the machining area in order to check the workpiece, the chucks and its clamping means, the steady-rest, etc. The access to the machining area in a machine according to U.S. Pat. No. 4,305,689-A is very limited due to the way in which steady rest, chucks and tool carriages occupy most of the space along the guides, thus making it more difficult for the operator to carry out inspection and maintenance. This and the fact that inspection and maintenance have to be carried out in uncomfortable and non-ergonomic positions, means that more time is needed to complete the tasks. This negatively affects productivity.

U.S. Pat. No. 5,078,556-A discloses a machine for machining crankshafts with two tool carriages arranged on different guides. A first tool support moves on top of an upper machine bed part, whereas a further tool support as well as headstock and tailstock are guided on an overhanging front surface of the upper machine bed part. This layout may overcome some of the problems involved with the arrangement known from U.S. Pat. No. 4,305,689-A: it appears to make the space between the chuck supporting parts less cramped, and chips will tend to fall onto the lower bed part and onto the chip conveyor, rather than on the guide surfaces. However, the bed layout is complex and the different items (milling unit, chuck supports, turning-broaching unit) are arranged at different heights over the floor, which may be disadvantageous from the point of view of ergonomy, for example, when tools and workpiece have to be inspected or replaced.

U.S. Pat. No. 7,179,029-B2 discloses an alternative arrangement, in which two tool carriages—referred to as "compound slides"—and two headstocks are placed on two parallel guide systems. This arrangement reduces the problem of lack of space between the bases of the headstocks and the bases of the tool carriages, and thereby allows the use of wider bases, that is, bases that have a larger extension in the direction parallel with the guide rails, thereby enhancing stiffness. U.S. Pat. No. 7,179,029-B2 explains how the increased availability of space also facilitates the use of protective covers. However, also this system involves important drawbacks:

The chucks are arranged at a substantial distance from the guide system on which the headstocks with the chucks move. This produces a cantilever effect, reducing the stiffness of the system, a stiffness that is especially important in view of the high cutting forces exerted on the crankshaft during the rough milling operations.

Chips could accumulate on and around the protective covers, such as between the covers on the first and the second guide systems, and where the protective covers on the second guide system abut against the steady rest. This can cause increased wear and even jamming of the telescopic covers, the steady rest, etc. Swarf and small chips may penetrate to the space beneath the covers and cause damage to the energy conduits, generally very sensitive to dirt particles and metal chips.

In addition, the layout with one guide system parallel to the other one means that the machine features a substantial size in the plane in which the guide rails are arranged, namely, a size of at least twice the size of each guide system. This can make it difficult to access all parts of the system from one side.

BRIEF SUMMARY

A first aspect of the disclosure relates to a machine for machining workpieces. The machine comprises a first column and a second column, the first column and the second column being arranged facing each other according to a first horizontal axis, which can be referred to as a "Z axis". The expression "facing each other" is intended to denote that the first column and the second column are placed more or less opposite each other, for example, in the sense that they and/or at least some of the components mounted on them at least partly overlap in their projection along the first horizontal axis. However, it does not mean that they have to substantially mirror each other. In this text, the term "column" generally refers to a support structure supporting at least a workpiece holding device and optionally a tool unit above a base such as a machine bed or floor. It does not necessarily imply a "column-like shape". When a column is moveable, it can also be referred to as a carriage. The columns are preferably configured to provide for stability and stiffness of the system, and for precise positioning of the workpiece in relation to the tool or tools during machining.

The machine further comprises a guide system for guided displacement of at least one of the first column and the second column in parallel with the first horizontal axis (the "Z-axis"). In some embodiments, both of the two columns are displaceable in parallel with the first horizontal axis or Z axis, so that their position in relation to a machine bed and in relation to each other can be adapted along the Z axis. In other embodiments, only one of the columns is displaceable along the Z axis, whereas the other column is fixed. Using a fixed column can for example imply reduced costs, but also less flexibility. The guide system may comprise one or more guide rails or any other suitable means for guiding the columns along the Z axis. In many embodiments of the disclosure, linear roller bearing guides are used for the displacement of the column or columns.

The machine further comprises a first tool unit adapted for supporting and driving a first rotatable tool, the first tool unit being arranged on the first column for controlled displacement in relation to the first column in parallel with a second axis perpendicular to the first horizontal axis. In some embodiments, the first tool unit is arranged for controlled displacement in relation to the first column only in parallel with the second axis, that is, only with one degree of freedom. In some embodiments, the first tool unit is arranged for controlled displacement in relation to the first column also according to at least one further degree of freedom, such as in parallel with a further axis, such as in parallel with a third axis perpendicular to the first horizontal axis and to the second axis. This is a more complex structure, but may be preferred in the case of, for example, very large and heavy workpieces, as it may, for example, allow for machining of the workpiece with eccentric portions around the circumference thereof without need to rotate the workpiece.

In many embodiments the machine further comprises a second tool unit adapted for supporting and driving a second rotatable tool, the second tool unit being arranged on the second column for controlled displacement in relation to the second column in parallel with the second axis and/or in parallel with a third axis perpendicular to the first horizontal axis. For example, both tool units can be arranged for controlled displacement in parallel with the same axis, for example, horizontally or vertically or at any other angle, or one tool unit can be arranged for controlled displacement according to one axis, such as a vertical axis, and the other tool unit can be arranged for controlled displacement according to another axis, such as a horizontal axis. Also, both tool units can be arranged for controlled displacement in relation to the respective column in parallel with two different axes, that is, each with two degrees of freedom in relation to the respective column. The potential advantages of this more complex and costly arrangement have been referred to above.

Each tool unit typically comprises means for supporting and driving a tool so as to rotate the tool. This does not mean that the tool unit necessarily incorporates the motor that origins the driving movement; this motor can be placed outside the tool unit but be linked to the tool through some kind of transmission, as known in the art. In some embodiments, the tool is an internal milling cutter. In other embodiments, the tool is an external milling tool. In other embodiments, the tool is a turn-turn-broaching tool. In yet other embodiments, the tool is a turning tool, for example, a turning turret that can be indexed by rotation to different positions for different turning operations. In some embodiments, both tool units comprise the same kind of tool, such as an internal milling cutter, an external milling tool, a turn-turn-broaching tool, a turning turret, etc. In other embodiments, one tool unit comprises one kind of tool selected from the list consisting of, for example, an internal milling cutter, an external milling tool, a turn-turn-broaching tool and a turning turret, and the other tool comprises another kind of tool selected from that list. Each tool unit is mounted on one of the columns and arranged for controlled displacement in relation to the column by corresponding guide and drive means.

The machine further comprises a first workpiece holding device arranged on the first column, the first workpiece holding device being arranged for controlled displacement in relation to the first column in parallel with the first horizontal axis. The machine further comprises a second workpiece holding device arranged on the second column. Each workpiece holding device can comprise a chuck or similar means for supporting an end of a workpiece. In many embodiments, the second workpiece holding device is arranged for controlled displacement in relation to the second column in parallel with the first horizontal axis. This is especially preferred when also the second column supports a tool unit, as it allows the workpiece to be displaced and positioned also in relation to this second tool unit, in accordance with the Z axis. However, in some embodiments, the second workpiece holding device may be fixed in relation to the second column, whereby Z-axis positioning of the workpiece in relation to the first tool unit can be accomplished by displacing the first workpiece holding device in relation to the first column, and the second column in relation to the first column, in parallel with the Z axis.

In accordance with this aspect of the disclosure, the first workpiece holding device and the second workpiece holding device are arranged for supporting a workpiece between them and for controlled rotation of the workpiece around a workpiece axis parallel with the first horizontal axis.

In addition, the machine comprises a drive system for controlled positioning of:
the first column in relation to the second column, and
the first workpiece holding device in relation to the first column,
in parallel with the first horizontal axis. In some embodiments, the drive system is also arranged or adapted for controlled positioning of the second workpiece holding device in relation to the second column, for example, so as to allow axial positioning of a workpiece in relation to a tool unit arranged on the second column. From a productivity point of view, it can be preferred to have two tool units, each arranged on one of the two columns, whereby the relative displacement between the columns and the relative displacement of the workpiece holding devices in parallel with the first horizontal axis allows both tools to be simultaneously positioned in correspondence with selected axial positions of the workpiece, for example, for simultaneous machining of the workpiece in correspondence with two different axial positions thereof.

According to this arrangement, the workpiece holding devices are arranged on the columns, and the tool unit is also arranged on one of the columns. As explained above, in many embodiments, there are two tool units, one on each of the columns.

The described arrangement allows for enhanced stiffness compared to many prior art systems. The fact that the workpiece holding device or devices are mounted on the column or columns supporting the tool unit or tool units means that the point of attachment between the workpiece and the machine can be very close to the respective column, which contributes to enhanced stiffness. For example, the chucks can be arranged at a substantial height above the floor or above the machine bed, but yet close to the respective column, which contributes to high stiffness without addition of further sturdy structures, for example, without any need for a sturdy and high steady-rest moving on the floor or machine bed. The chucks can be placed at a substantial height above the floor or machine bed taking advantage of the stability and stiffness of the respective column, including at least one column supporting a tool. The entire circuit of forces involved with the machining can be kept in the columns. The height of the chucks above the machine bed may be chosen taking into account not only the space needed for the different components and their movement during machining, but further in order to place components such as tools and workpiece at a height that allows inspection, manipulation and/or maintenance by a human operator under ergonomically favorable conditions, yet without any need for high headstocks. In many existing machines the workpiece is placed relatively close to the machine bed, at a low height, in order to avoid that the stiffness of the system is deteriorated due to the height of the headstocks, and/or in order to reduce the need to enhance the stiffness of the headstocks. This kind of positioning of the workpiece close to the machine bed may however be bad from an ergonomic point of view. Furthermore, arranging the workpiece relatively high up in relation to the floor or machine bed can serve to reduce the time needed for loading and unloading, as the strokes of the gantry loader in the vertical direction may become significantly shorter.

As explained above, headstocks guided on the floor or machine bed are known in the art, and involve inter alia drawbacks in terms of their cantilever effect, especially when the workpiece is to be supported at a substantial height above the floor or machine bed where the headstocks are guided. Obviously, stiffness can be enhanced by making the headstocks more robust, but this implies additional costs and tends to make the machine more bulky. On the other hand, as the present disclosure takes advantage of the column(s) supporting the tool unit(s) for placing the workpiece holding devices at the desired height and to provide stability and stiffness, the corresponding workpiece holding devices can be relatively small and feature a relatively small mass, thereby facilitating movement thereof. This implies that less powerful drive means are needed, which likewise has a positive impact on aspects such as cost and size.

The two columns can be positioned in relation to each other using the guide system, by displacing one or both of the two columns according to the first horizontal axis. Thus, only one guide system is needed on the floor or on the machine bed. The further positioning of the workpiece along the first horizontal axis for "Z" positioning the workpiece in relation to the tools can be achieved by displacing the workpiece holding devices in relation to their respective supports on the columns. This provides for a compact device with a limited footprint, and facilitates access to, for example, the space between the tool units for, for example, maintenance or replacement of tools under ergonomically favorable conditions. Also, access to the workpiece is easy and can be accomplished under ergonomically favorable conditions.

In addition, as the workpiece holding devices are mounted on the columns, there is no need for a guide system for these devices on the machine bed, neither between the columns nor in parallel with the guide system for the columns. This implies more space available between the columns, which allows the bases of the columns to be relatively large in parallel with the first horizontal axis, thereby enhancing stiffness and stability, while still allowing sufficient space between the columns in order to make it possible for an operator to access this space under ergonomically favorable conditions, and/or for allowing incorporation of one or more steady-rests between the columns. On the other hand, the absence of a second guide system under the workpiece avoids the problem of chips falling onto and interfering with such a second guide system. Instead, chip removal means such as a chip conveyor can be arranged under the workpiece.

This layout is also flexible. For example, the same machine can be adapted for external milling, internal milling, turn-turn-broaching and turning by relatively minor modifications, such as by adaptation or replacement of the tool units and/or of the workpiece holding devices.

Machining can be carried out by axis interpolation between the second axis and the axis of rotation of the workpiece, as known in the art.

In some embodiments of the disclosure, the first and/or the second workpiece holding devices are slidably attached to a side of the respective column. This attachment of the workpiece holding devices to the sides of the respective columns makes it possible to arrange the workpiece sideways from the columns, thereby reducing the tendency of chips to fall in the space between the two columns, where chips may interfere with the guide system for the columns and/or with one or more steady rests, and where removal of the chips may be more difficult. Instead, with this arrangement of the workpiece holding devices, chips can fall directly into an area adapted for chip removal, for example, by means of a chip conveyor.

In some embodiments of the disclosure, at least one of the workpiece holding devices is attached to the respective column through an intermediate slide part, said intermediate slide part being displaceable in relation to the respective column in parallel with the first horizontal axis, and each workpiece holding device being displaceable in relation to the respective intermediate slide part in parallel with the first horizontal axis. Thus, the overhang effect can be reduced: the maximum stroke of the workpiece holding device in relation to the column is the result of the combination of the stroke of the first slide part in relation to the column, and the stroke between the workpiece holding device and the first slide part. This kind of telescoping arrangement further contributes to stiffness and reduced overhang.

In some embodiments of the disclosure, the machine comprises a plurality of rails for supporting a sliding movement of one or both of the workpiece holding devices in relation to the respective column. Thus, by using rails attached to the workpiece holding devices and/or to the column, and/or to the optional intermediate slide part, and by using appropriate drive means, the workpiece holding devices can be reliably positioned along the Z axis, thereby positioning the workpiece in the desired position in relation to the tools.

In some embodiments of the disclosure, one or both of the workpiece holding devices are slideably attached to the respective column by attachment means the vertical projection of which at least partly overlaps with the guide system. For example, rails and/or other means by which the workpiece holding devices are attached to the columns can be placed over an area delimited by for example guide rails of the guide system, thereby contributing to enhanced overall stiffness and stability. For example, one or both of the workpiece holding devices or their attachment means can be provided in recesses or similar in the sides of the columns, for example, so that the workpiece holding devices partly slide within the body of the column. In some embodiments, part of the workpiece holding devices and/or of the attachment means attaching the workpiece holding devices to the column are placed above a rail of the guide system, or above a space delimited by the rails—or by the outermost rails, if there are more than two rails in parallel—of the guide system. This can further contribute to stability and reduced overhang.

In some embodiments of the disclosure, the second axis is a vertical axis. This arrangement can contribute to minimize the over-all footprint of the machine on the horizontal plane, especially in embodiments in which both tool units are displaced in parallel with the second axis.

In some embodiments of the disclosure, the second axis is a second horizontal axis, perpendicular to the first horizontal axis. This arrangement can contribute to minimize the height of the machine, especially in embodiments in which both tool units are displaced in parallel with the second axis. In addition, a need for counterweights for the displacement of the tool units can be avoided.

In other embodiments, the second axis is an axis that is neither vertical nor horizontal.

In some embodiments of the disclosure, the machine further comprises a substantially vertically arranged chip guard, arranged for preventing chips removed from the workpiece during machining from reaching a space between the columns. This space is not necessarily the entire space between the columns, but preferably comprises the space where guide means, such as for example guide rails for the column(s) and/or for one or more steady-rests, are present. In some embodiments, the chip guard is arranged so that it does not interfere with the bases of the columns and/or of the steady rest. In some embodiments, the chip guard is a telescopic or accordion-type chip guard, so that its extension in parallel with the first horizontal axis can be modified, for example, in accordance with the displacement of the columns and/or the steady-rest in parallel with this axis.

In some embodiments of the disclosure, the machine further comprises a steady-rest. In this text, the term "steady-rest" refers to a support for supporting the workpiece at an intermediate position, that is, at a position between the positions where the workpiece is held by the workpiece holding devices. In many embodiments, the steady-rest is displaceable in parallel with the first horizontal axis. In some embodiments of the disclosure, the steady-rest is guided on the guide system, for movement in parallel with the first horizontal axis, between the first column and the second column. That is, in these embodiments, for example a base of the steady-rest is at least partly placed between the two columns. This can help to make efficient use of the guide system, as the same guide system can be used for guiding the movement of one or more columns as well as for guiding the movement of the steady-rest. In some other embodiments of the disclosure, the steady-rest is guided on an additional guide system, for example, an additional guide system that is spaced from the previously mentioned guide system for guided displacement of the column or columns. For example, the second guide system can be a guide system provided on a longitudinal side surface of a machine bed supporting the columns. This can provide for more free space between the columns. For example, such additional space can facilitate installation of a standard steady-rest with a relatively wide body, which can serve to enhance stiffness of the clamping provided by the steady-rest. In some configurations of the last embodiment, the steady-rest is arranged so that it can be displaced along the Z axis from an axial position on one side of a tool or tool unit, to an axial position on the other side of the tool or tool unit. For example, the steady-rest can be vertically retractable to allow for this kind of displacement. Thereby, the steady-rest can be displaced to a position between one of the workpiece holding devices and its correspondent tool unit, to support the workpiece between the workpiece holding device and the tool unit. This option can be useful to enhance the supporting stiffness when a tool arranged on a first column supporting a first end of the workpiece has to cut a portion of the workpiece located in correspondence with the opposite end of the workpiece. This requires a substantial retraction of the workpiece holding device linked to the first column, creating a wide gap between the chuck and the tool.

In at least some embodiments incorporating a steady-rest, the machine can be operated supporting the workpiece by one of the workpiece holding devices and by the steady-rest, but not by the other workpiece holding device. This can be useful to allow, for example, machining of one or both of the ends of the workpiece, or of portions close to one or both ends of the workpiece, without interference between the respective tool or tool unit and the respective workpiece holding device.

In some embodiments of the disclosure, at least one of the workpiece holding devices comprises a torque motor for rotation of the workpiece. In some embodiments, both workpiece holding devices comprise torque motors for synchronized rotation of the workpiece. Torque motors have been found to provide for special advantages in the context of the machine described above. For example, the high torque at moderate speeds and even when stalled has been found to be appropriate for milling operations, where the workpiece can be subjected to substantial torques. On the other hand, torque motors are appropriate for achieving a compact design, due to their compactness. On the other hand, they provide for high accuracy in what regards the positioning, and for good speed control. In addition, torque motors allow for a modular design facilitating adaptation of a machine for different kinds of operation, for example, facilitating the changes in drive means necessary or appropriate for adapting one basic machine structure so as to switch between, for example, internal milling, external milling, turn-turn-broaching and/or turning layouts.

In some embodiments of the disclosure, the tool units are provided with internal milling cutters.

In some embodiments of the disclosure, the machine is adapted for machining shafts with eccentric portions, such as crankshafts.

A further aspect of the disclosure relates to a method for machining a workpiece, comprising:

loading a workpiece into a machine as described above, so that the workpiece is held by the workpiece holding devices;

positioning the workpiece in relation to at least one tool of the machine according to the first horizontal axis, by displacing at least one column in parallel with the first horizontal axis and by displacing at least one of the workpiece holding devices in relation to the respective column in parallel with the first horizontal axis;

machining the workpieces, including displacing at least one tool unit perpendicularly to the first horizontal axis and rotating the workpiece around an axis parallel with the first horizontal axis in order for the tool or tools to interact with different circumferential portions of the workpiece (after finishing machining of the workpiece in accordance with one or two axial positions thereof—depending on whether one or two tools are used simultaneously—, the positioning of the workpiece relative to the tools according to the Z axis can be repeated, followed by a new machining step, etc.; that is, machining and relative Z axis displacement between tools and workpiece can be repeated, until the machining of the workpiece has been completed, as far as the machine is concerned);

removing the workpiece from the machine.

In some embodiments of the disclosure, loading the workpiece into the machine comprises at least one movement of a workpiece holding device in parallel with the first horizontal axis, so as to axially clamp the workpiece between the workpiece holding devices. As explained above, the kind of light-weight workpiece holding devices that can be accommodated due to this machine layout facilitates rapid loading based on a horizontal movement between workpiece and chucks, instead of the vertical or radial loading sometimes used in the art. This provides for important advantages. In many prior art machines, the chucks have to be designed with radial channels and/or incorporate special supports for vertical loading that often have to be specific for a specific type of workpiece, such as a specific crankshaft model. This implies high costs due to the need to provide different sets of supports and/or chucks, that is, for example, one set of supports and/or chucks for each type of workpiece that is to be machined, for example, one set of supports for each crankshaft model. On the other hand, this kind of workpiece-specific chuck and support assemblies involves the disadvantage that each change of workpiece type, for example, switching from one crankshaft model to another, requires substantial adaptation or replacement of the chucks and/or the supports. These disadvantages can be avoided by means of the present disclosure, in many embodiments of which rather general chucks can be used, that can accommodate different workpiece types, such as different crankshaft models, for example, by axial clamping by the Z-axis movement of one or both workpiece holding devices, without any need for the workpiece-specific additional supports frequently used in the art. Thus, change from one type of workpiece to another kind of workpiece can be carried out with a minimum of changes to hardware. Thus, the arrangement as per the present disclosure can be helpful to reduce costs and to increase flexibility, allowing adaptation of a machine to different workpiece types by software change rather than by hardware change. This is especially beneficial in installations where the type of workpiece to be machined is changed with relatively high frequency. Additionally, this aspect of the disclosure facilitates the use of chucks with a simple design without substantial radial channels and/or without additional workpiece-specific supports, thereby reducing the risk for malfunction due to chip accumulation.

A further aspect of the disclosure relates to a method for adapting a machine as described above from a first configuration to a second configuration or vice-versa, wherein the first configuration is a configuration for external milling and/or internal milling of a workpiece, and the second configuration is a configuration for turn-turn-broaching and/or turning of a workpiece. The method includes the step of replacing at least part of a motor of one of the workpiece holding devices or of both of the workpiece holding devices, for modification of a rotational speed characteristic of the workpiece holding device, the motor being a motor for rotation of the workpiece. As explained above, the machine layout according to the disclosure can serve to facilitate adaptation between different configurations, so that the same basic machine can be adapted, for example by relatively minor changes, from or to configurations for internal milling, external milling, turn-turn-broaching, etc. This may involve replacement of parts such as chucks and/or tools, and/or change of the position of components, such as for example change of the position of the workpiece holding devices along the vertical axis.

In what regards the workpiece holding devices, a change between for example internal milling and external milling can in some embodiments of the disclosure be carried out without changing the configuration of the workpiece holding devices as such. However, a change between a configuration for internal or external milling and a configuration suitable for turning or turn-turn-broaching may in some embodiments require more substantial changes to the workpiece holding devices, for example, in what regards the rotational speed characteristics of the motors used for rotation of the workpiece. For example, for internal or external milling, the workpiece is to be rotated at a relatively low speed, and with precise numerical control of the angular position. Contrarily, for turn-turn-broaching or turning, the workpiece is generally to be rotated ata substantially higher speed, but without control of the angular position. Also the torque requirements may be different for milling and for turn-turn-broaching or turning. Thus, generally, in what regards the workpiece holding device, a motor suitable for rotation of the workpiece for milling may be inadequate for turn-turn-broaching or turning, and vice-versa.

For this purpose, replacement of the motor or at least part of the motor used for driving rotation of the workpiece may be necessary or preferable. For this purpose, in some embodiments of the disclosure the motor is arranged at a rear end of the workpiece holding device opposite the end supporting the chuck, such that the motor or part of the motor can be replaced easily at the rear end, for example, without removing the main spindle of the workpiece holding device, that is, without removing the spindle to which the chuck is attached. This main spindle can in some embodiments be supported by bearings suitable both for high and low speed rotation, that is, compatible both with milling and with turning or turn-turn-broaching. Thus, the hardware adaptation necessary for converting a milling machine into for example a turn-turn-broaching machine or vice-versa can, in what regards the configuration of the workpiece holding devices, be substantially limited to replacement of the motor or part thereof, and if necessary replacement of the chucks. Replacement of the motor at the rear end of the workpiece holding device, that is, at the end opposite the chuck can in many embodiments be implemented easily and maybe especially easily when the motor is a torque motor.

Changing configuration typically also involves the replacement of tools (external milling tools, internal milling cutters, tools for turn-turn-broaching or turning) and/or of chucks. In some embodiments, also the motors for driving the tools may need to be replaced.

BRIEF DESCRIPTION OF THE DRAWINGS

To complete the description and in order to provide for a better understanding of the disclosure, a set of drawings is provided. Said drawings form an integral part of the description and illustrate some embodiments of the disclosure, which should not be interpreted as restricting the scope of the disclosure, but just as examples of how the disclosure can be carried out. The drawings comprise the following figures:

FIGS. 8A-8C schematically illustrate loading of a crankshaft into a machine, in accordance with an embodiment of the disclosure using the second type of chuck.

FIGS. 10A and 10B are a perspective view and a rear view, respectively, of a machine according to a third embodiment of the disclosure.

DETAILED DESCRIPTION

Figure 1:
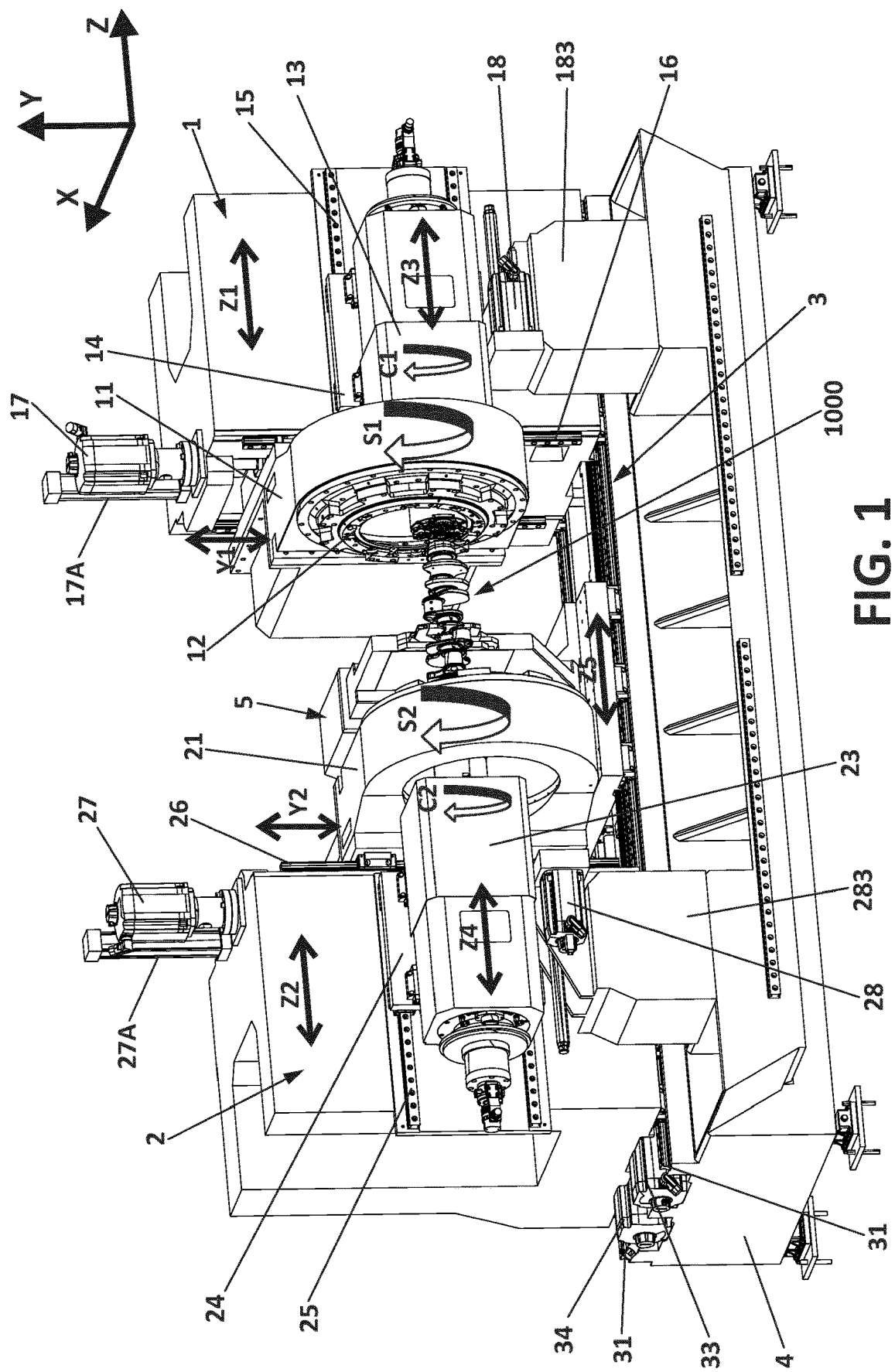
FIG. 1 is a perspective view of a machine according to a first embodiment of the disclosure.
Figure 2:
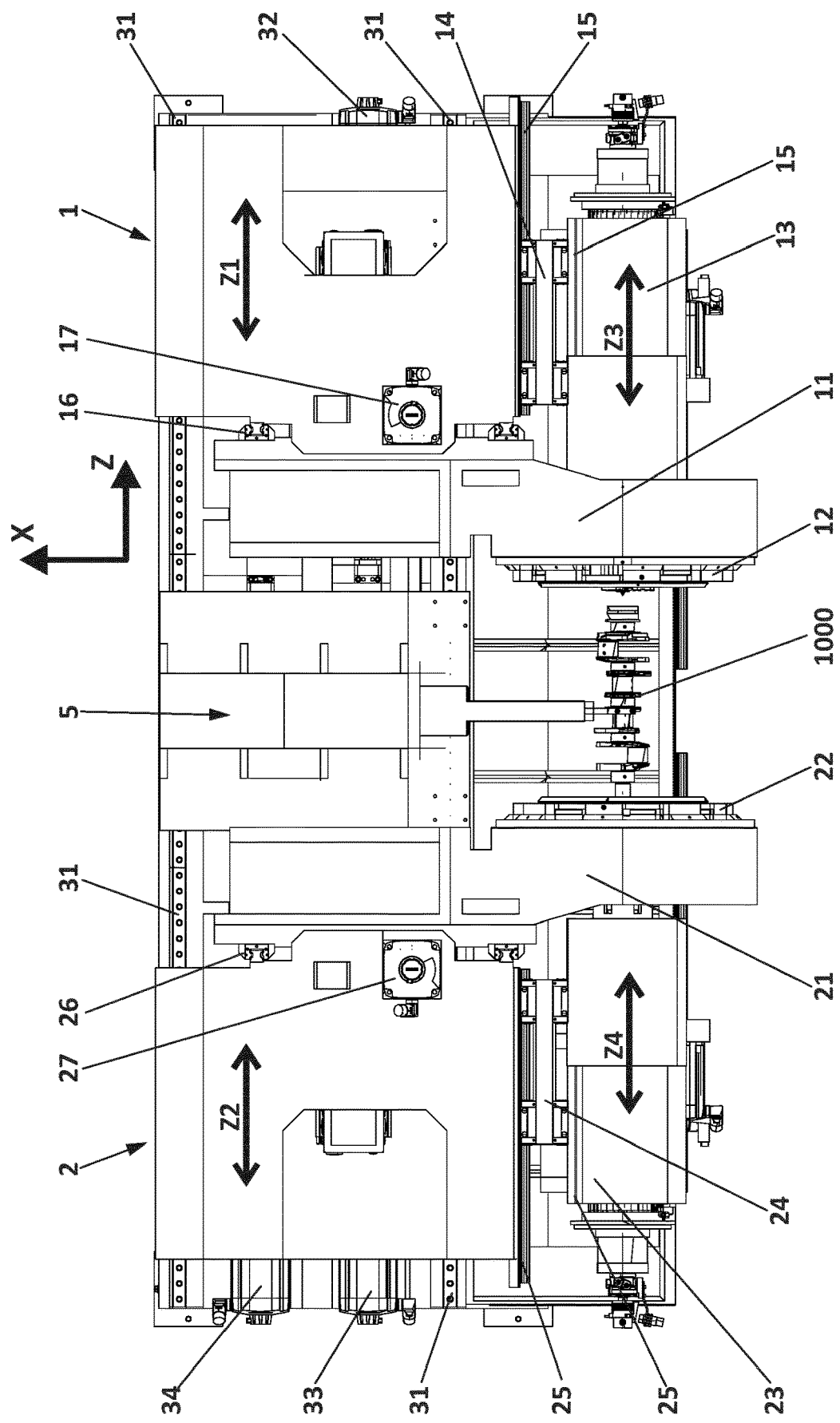
FIG. 2 is a top view of the machine according to the first embodiment of the disclosure.

According to a first embodiment of the disclosure shown in FIGS. 1 and 2, the machine comprises two columns 1 and 2, both moveable on guide rails 31 of a guide system 3 arranged on top of a machine bed 4. The first column 1 is driven along the rails 31 by first drive means 32, and the second column 2 is driven along the rails 31 by second drive means 33. In addition, a steady-rest 5 is provided, also moveable on the guide rails 31 of the guide system and driven by third drive means 34. The drive means can be of any kind, as long as they allow for controlled displacement and positioning of the columns and the steady rest along the guide system. For example, in some embodiments, ballscrews driven by electrical motors, such as servo-motors, can be used. For example, linear or rotary motors can be used.

The guide system 3 and the drive means are configured for controlled displacement and positioning of the columns 1 and 2 and the steady-rest 5 in parallel with a first horizontal axis, referred to herein as the Z axis. The first column 1 is driven according to a Z1 axis of the machine, the second column 2 is driven according to a Z2 axis of the machine, and the steady-rest is driven according to a Z5 axis of the machine, as schematically illustrated in FIG. 1. Roller bearing linear guides can be used for the movement of the columns and/or for movement of the steady-rest in parallel with the Z axis.

The first column supports a first tool unit 11, which is displaceable according to an Y1 axis of the machine, in parallel with a vertical axis, referred to as the Y axis herein. The tool unit 11 is guided by rails 16 and driven in the vertical direction by drive means 17, for example, by an electrical motor and a ball-screw. Similarly, a second tool unit 21 is arranged on the second column 2, guided by guide rails 26 and driven by drive means 27 for displacement and positioning according to an Y2 axis of the machine, likewise parallel with the vertical axis Y. In the illustrated embodiment, each tool unit comprises an internal milling cutter 12, 22, for carrying out internal milling of a workpiece 1000. In the illustrated embodiment, the workpiece 1000 is a crankshaft. The tool 12, 22 is arranged for rotation according to a respective S1, S2 axis of the machine, as schematically illustrated in FIG. 1. In this embodiment, each column further comprises counterweight means, such as hydraulic counterweight means 17A, 27A, for assisting the drive means 17, 27 in the vertical displacement of the tool units.

Each column further supports a workpiece holding device 13, 23, which is displaceable in accordance with a respective Z3, Z4 axis of the machine, in parallel with the Z axis. In this embodiment, the drive means 18, 28 for driving the workpiece holding devices in parallel with the Z axis are placed below the respective workpiece holding device 13, 23, on respective supports 183, 283. Each workpiece holding device 13, 23 comprises a chuck or similar for holding and supporting an end of the workpiece 1000, and drive means 138, 139 (cf. FIG. 13) for rotating the chuck according to a respective C1, C2 axis of the machine, as schematically illustrated in FIG. 1. In this embodiment, both workpiece holding devices comprise drive means 138, 139 for rotating the respective chuck, such as to minimize torsional forces during rotation and machining of the workpiece 1000. Torque motors can be used for rotating the chucks.

To minimize the overhang of the workpiece holding device 13, 23 in relation to its attachment to the respective column 1, 2, the workpiece holding device 13, 23 is attached to the respective column 1, 2 through an intermediate slide part 14, 24, which is displaceable in relation to the respective column 1, 2 in parallel with the Z axis, each workpiece holding device 13, 23 being displaceable in relation to the respective intermediate slide part 14, 24 in parallel with the Z axis. In this embodiment, rails 15, 25 are provided for the sliding displacement of the intermediate slide parts 14, 24 in relation to the respective column 1, 2, and for the sliding of the workpiece holding device 13, 23 in relation to the respective intermediate slide part 14, 24, as schematically illustrated in FIG. 2. That is, a kind of telescopic arrangement is provided for displacement of the workpiece holding devices in relation to the respective columns. In other variants of this embodiment, other means for telescopic movement between the workpiece holding device and the respective column can be used. Also, although a two-stage telescopic system has been illustrated, in other embodiments more than two stages can be used.

In addition, in this embodiment the machine comprises a vertical chip guard 6 (not shown in FIG. 1, but schematically illustrated in, for example, FIGS. 5A and 6A) of the telescope or accordion type, that adapts its configuration in accordance with the movement of the steady-rest 5 and the columns 1, 2 in parallel with the Z axis. As shown in for example FIGS. 5A and 6A, this chip guard 6 prevents chips produced during operation on the workpiece 1000 from reaching the space on the other side of the chip guard, where for example the rails 31 of the guide system are arranged, thereby reducing the risk of interference between chips and the guide system 3. This means that modern roller bearing linear guides can be a suitable option for guiding the columns and/or the steady-rest along the guide rails 31, in spite of the fact that such guides are generally sensitive to chips.

Figure 5A:
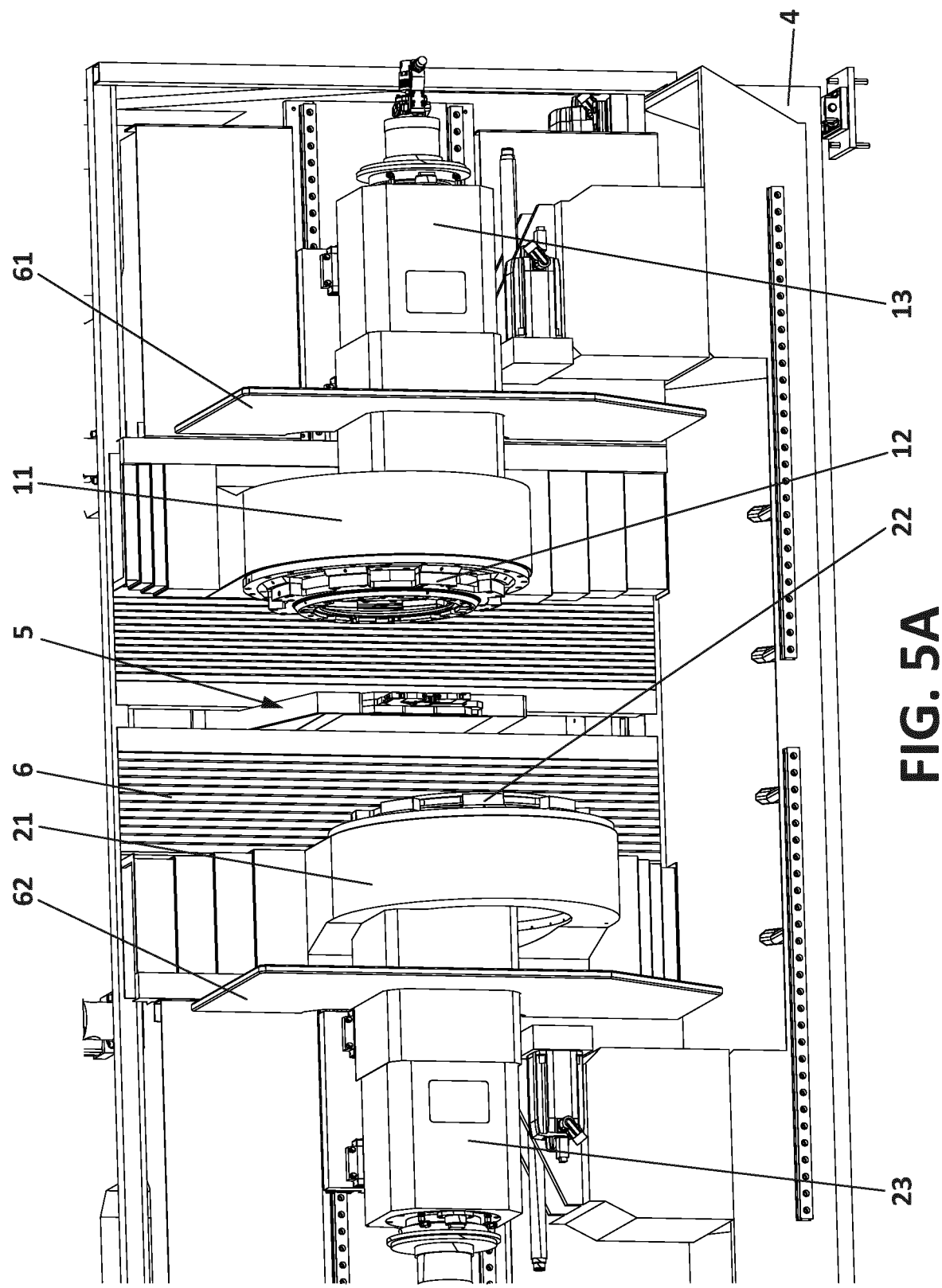
FIGS. 5A and 5B are two perspective views of the machine in accordance with an embodiment of the disclosure, schematically illustrating access to the tools for, for example, maintenance.
Figure 6A:
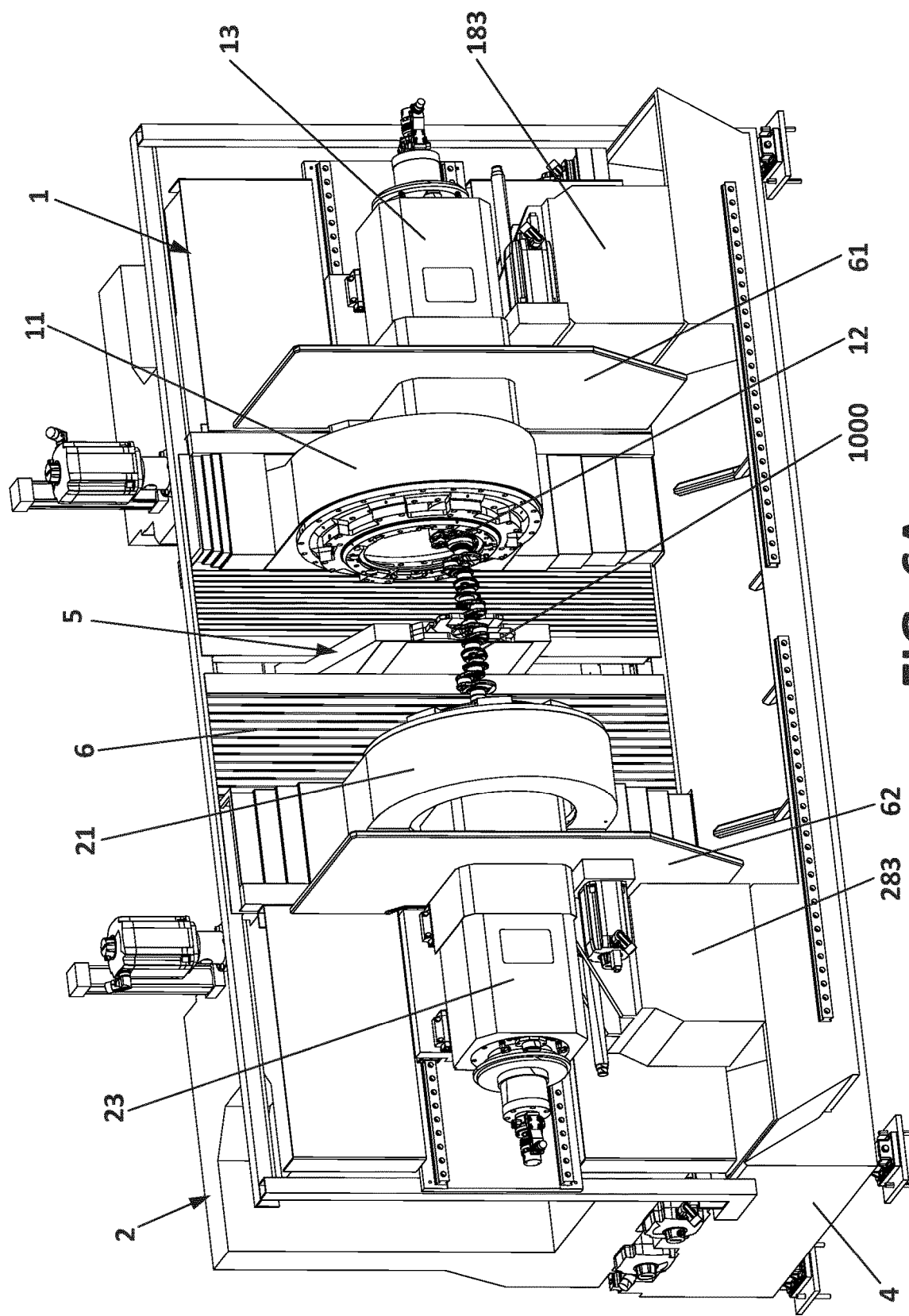
FIGS. 6A and 6B schematically illustrate adaptation of a machine in accordance to the first embodiment of the disclosure, from internal to external milling.

In addition, FIGS. 5A and 6A illustrate how additional chip guards 61, 62 can be arranged to prevent chips produced during machining of the workpiece 1000 from reaching the components by which the workpiece holding devices 13, 23 are linked to the respective columns 1, 2.

Figure 3A:
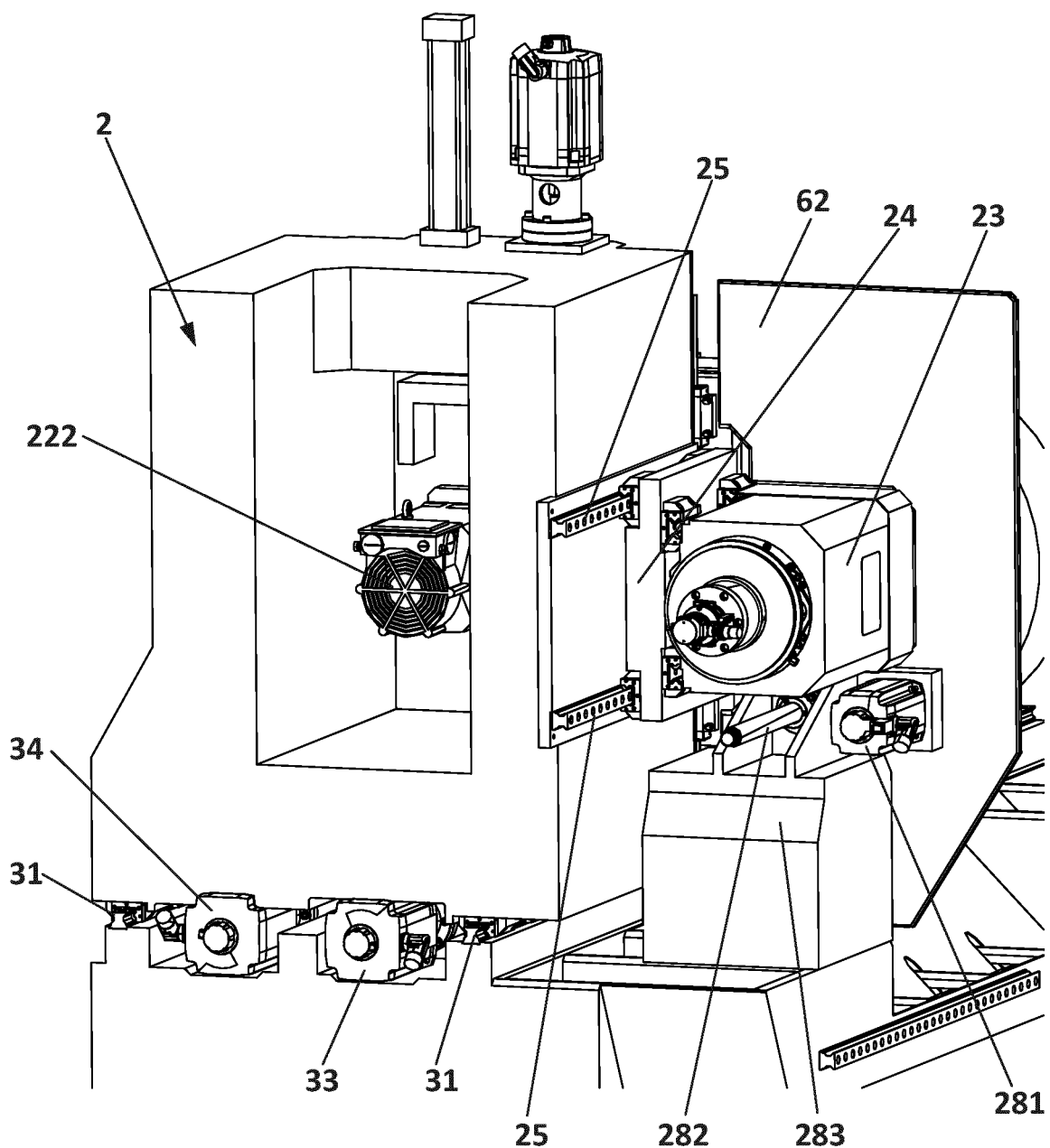
FIGS. 3A and 3B are a perspective view and a rear view, respectively, of part of the machine according to the first embodiment of the disclosure, including the drive means for a workpiece holding device.
Figure 3B:
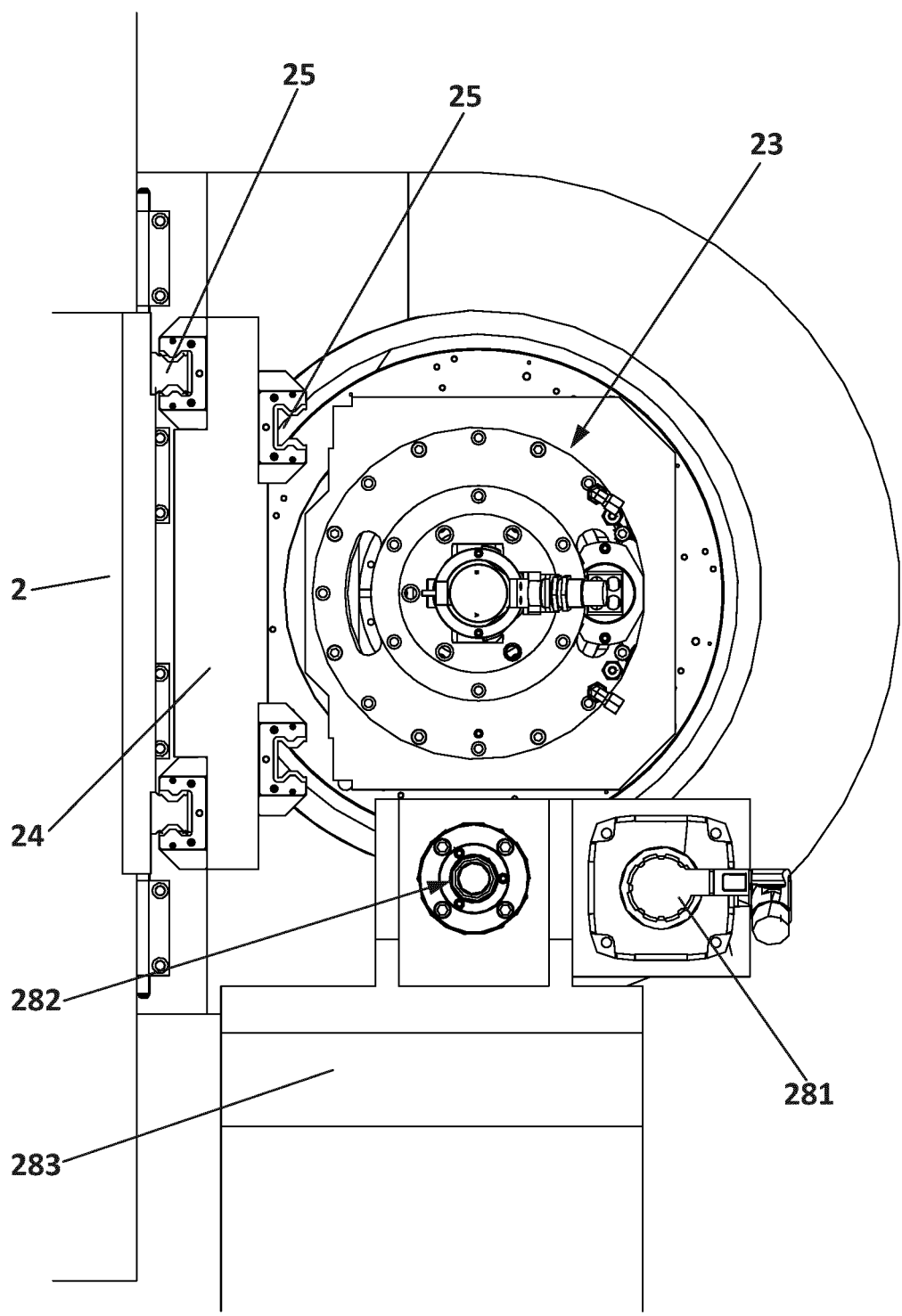

FIGS. 3A and 3B schematically illustrate how the drive means for the workpiece holding device 23 can comprise a motor 281 for displacing the workpiece holding device in parallel with the Z axis by means of a ball-screw unit 282. However, any other suitable drive means can be provided. The drive means are arranged on the support 283. FIG. 3B also illustrates the two-stage telescopic linkage between the workpiece holding device 23 and the column 2, via the intermediate slide plate 24 and rails 25. In addition, FIG. 3A schematically illustrates the drive means 222 for driving the rotary tool 22.

Figure 4:
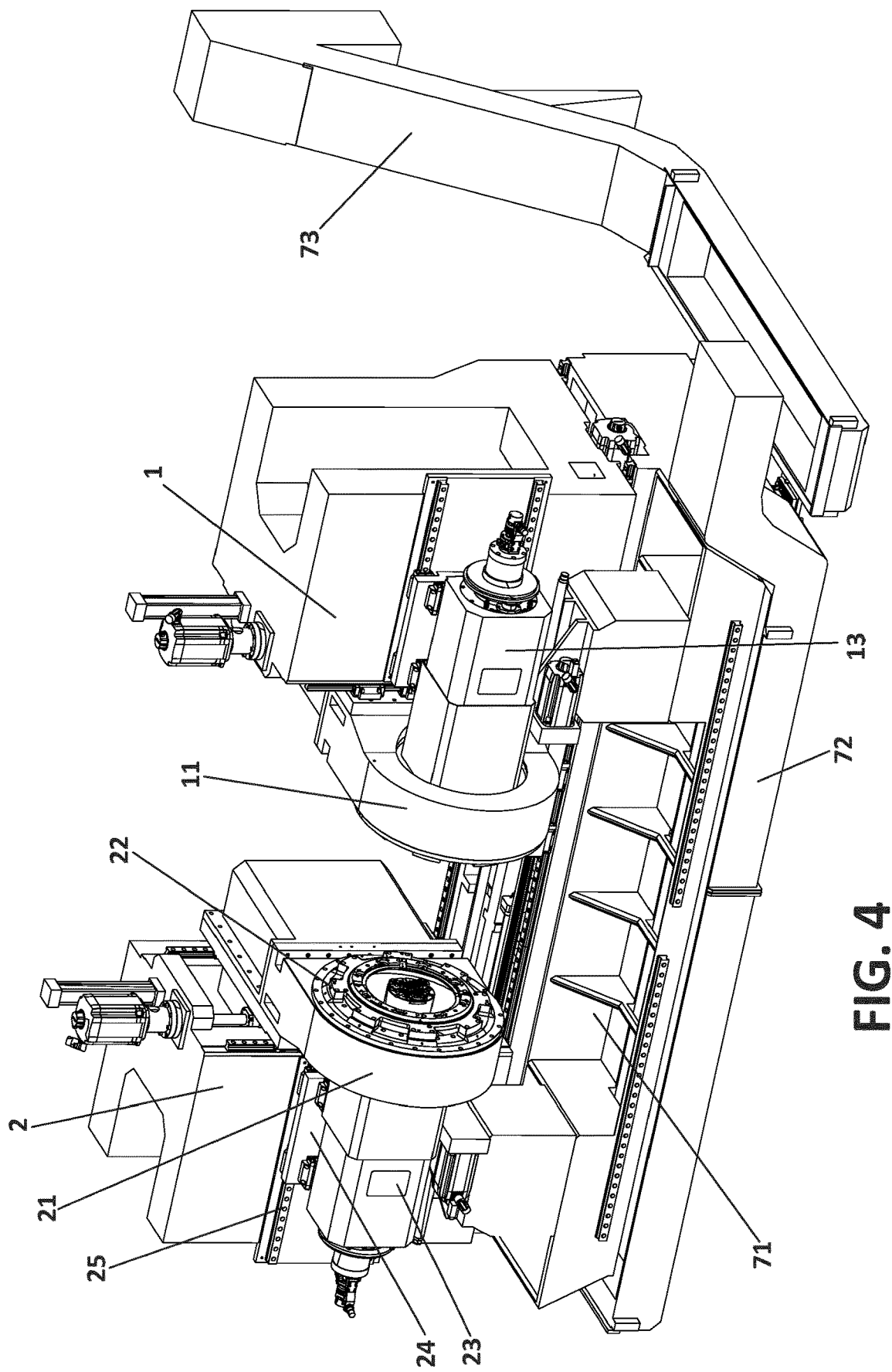
FIG. 4 is a perspective view schematically illustrating one way in which a chip conveyor can be incorporated.

FIGS. 4A and 4B schematically illustrate how a chip conveyor can be incorporated in a machine according to this embodiment of the disclosure. A tray-like arrangement 71 can be provided along one side of the machine to guide chips removed from the workpiece during machining to a first chip conveyor 72, arranged to transport the chips to a second chip conveyor 73 arranged at an end of the machine. The first chip conveyor 72 is covered by a grid platform (tramex), so that it allows chips to reach the conveyor while the operators can stand on the platform for manual operations in the machining area, such as tool exchanges.

It is clear from FIGS. 1 and 2 how both the tool units 11, 21 and the workpiece holding devices 13, 23 are arranged on the two columns, which can be positioned in relation to each other using the guide system 3, by displacing one or both of the two columns in parallel with the Z axis. Thus, only one guide system 3 is needed on the machine bed 4. It is also clear from FIGS. 1 and 2 how the axial position of the workpiece in relation to the tools 12, 22 is determined by the combination of the positions of the columns and the positions of the workpiece holding devices along the Z axis, that is, by the Z1, Z2, Z3 and Z4 axes of the machine. In FIGS. 1 and 2 it can be appreciated how the footprint of the machine on the horizontal plane is relatively small, thereby facilitating access to, for example, the space between the tool units for, for example, maintenance or replacement of tools, under ergonomically favorable conditions.

Figure 5B:
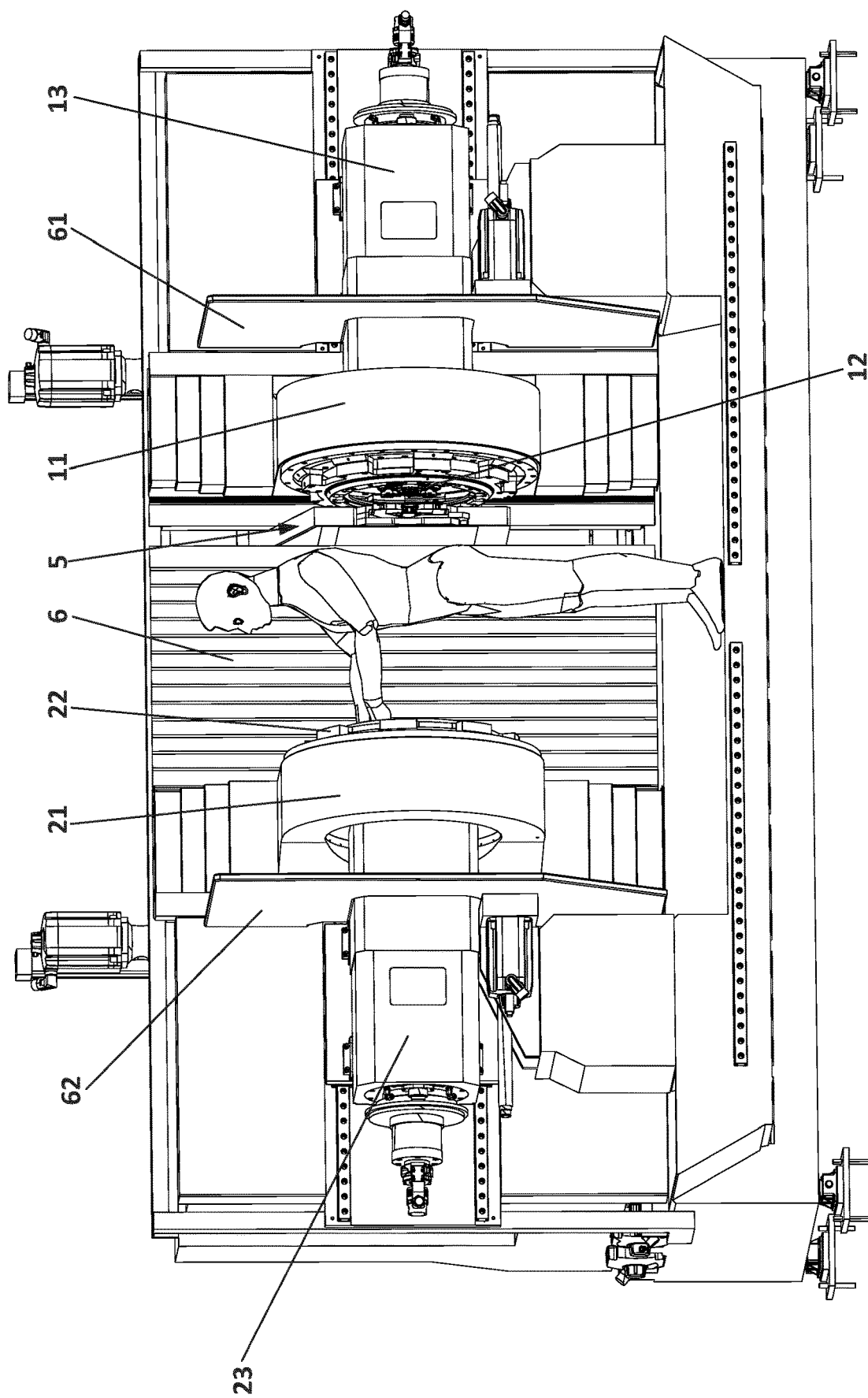

This is schematically illustrated in FIGS. 5A and 5B. For example, for maintenance or replacement of a tool 22, the steady-rest 5 can be driven towards a position close to the other tool 12, as schematically illustrated in FIG. 5B, thereby leaving sufficient space for an operator to position herself or himself in front of the tool 22.

Also, it is clear from FIG. 1 how access to the workpiece 1000 is easy and can be accomplished under ergonomically favorable conditions, from the side of the machine. It is also clear from FIG. 1 how the absence of any workpiece holding device between the columns provides for ample space for the columns and the steady-rest on the guide system 3. It is also clear how the chips produced during machining of the workpiece will directly fall onto a very limited area of the machine bed, and especially not onto the area including the guide rails 31. From FIGS. 4A and 4B it is clear how a chip conveyor can be arranged for removing chips that are produced during machining of the workpiece.

Figure 6B:
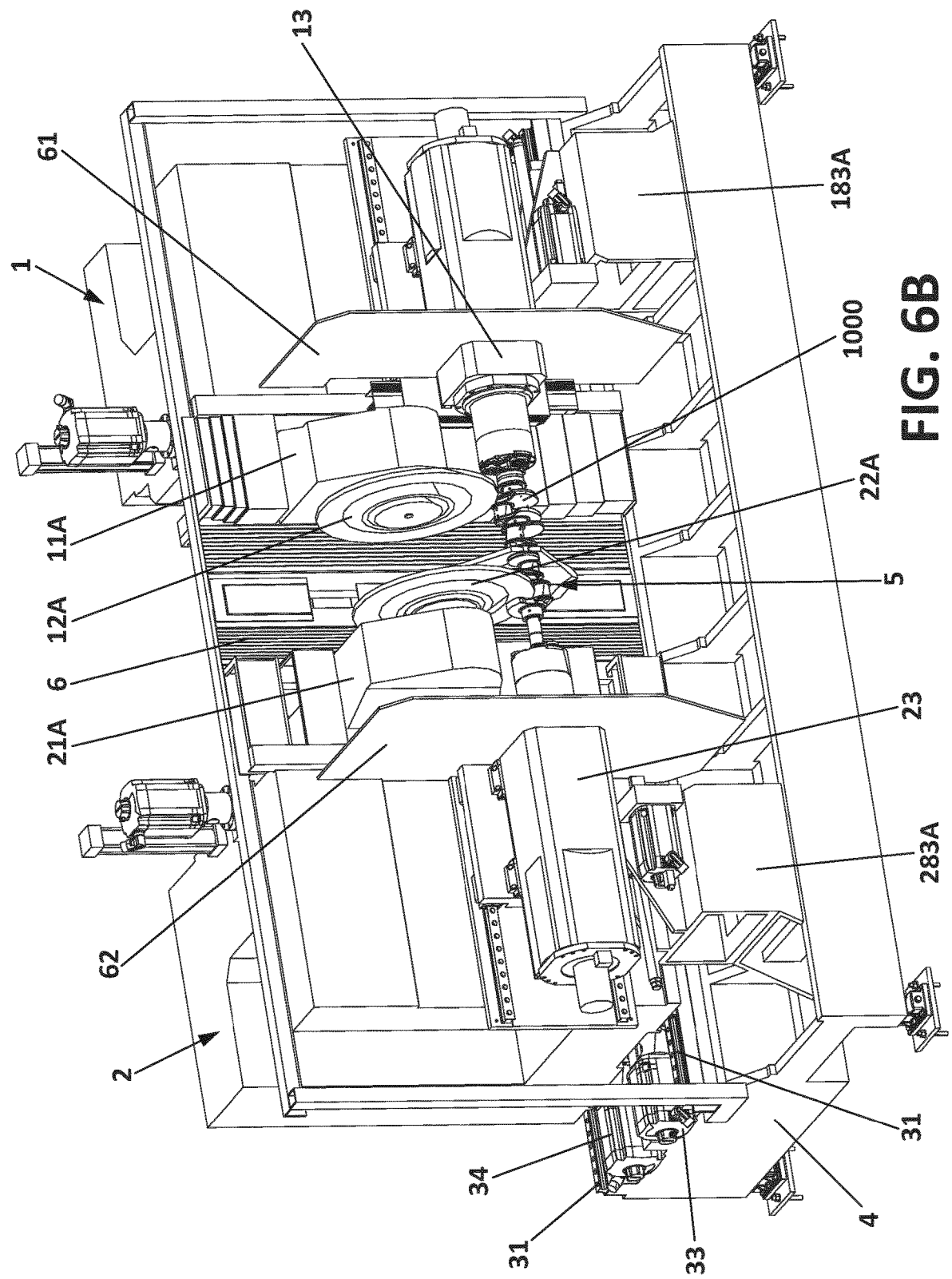
Figure 13:
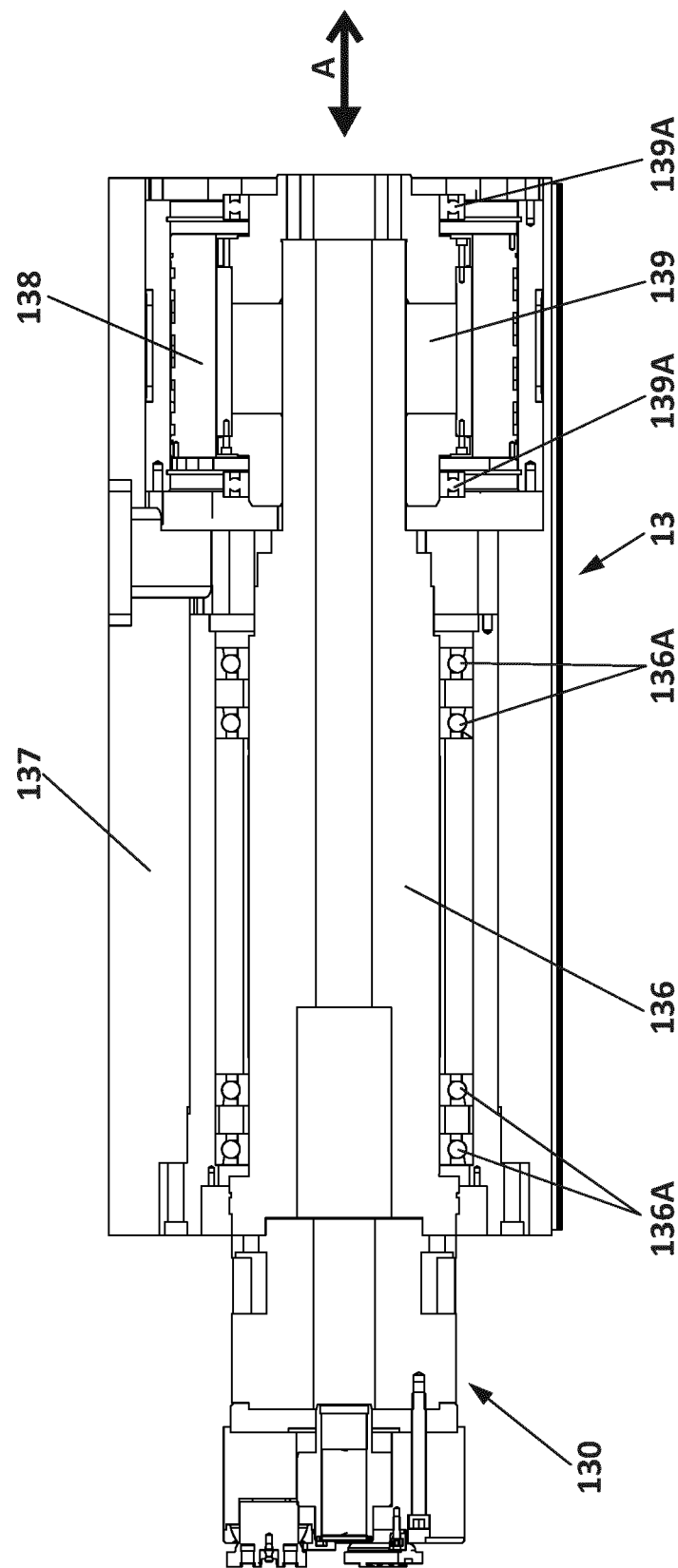
FIG. 13 is a schematic view of a longitudinal cross section of a workpiece holding device that can be used in an embodiment of the disclosure.

FIGS. 6A and 6B schematically illustrate how a machine as illustrated in FIGS. 1 and 2 can be adapted from an internal milling configuration to a configuration for external milling, by adapting or replacing the tool units 11, 21 for internal milling cutters 12, 22 by tool units 11A, 21A adapted for external milling tools 12A, 22A. Additionally, the workpiece holding devices 13, 23 are placed at a lower position on the respective column 1, 2, and the supports 183, 283 for the drive means for the workpiece holding device are replaced by supports 183A, 283A adapted for this new position of the workpiece holding devices along the Y axis. Additional adaptation of the steady-rest may be necessary to allow its clamping means to be positioned in accordance with the new position of the workpiece, closer to the machine bed 4. That is, the basic machine structure and even the tool driving unit can be used both for internal and external milling. The machine can also be easily adapted for turn-turn-broaching or turning; here, the general layout shown in FIG. 6B can be appropriate. Basically, only the tool or tool units need to be replaced. Additionally, the drive means (comprising, for example, a torque motor with rotor 138 and stator 139, as schematically illustrated in FIG. 13) for the C1, C2 rotation of the workpiece may need to be replaced to provide for higher rotation speed, and the drive means 222 for driving the tools may need to be replaced or adapted to be more appropriate for rotation S1, S2 of a turn-turn-broaching tool.

In the illustrated embodiment, both columns are displaceable in parallel with the Z axis. In some alternative embodiments, only one of the columns is displaceable, the other one being fixed. This may be disadvantageous in terms of flexibility but advantageous in terms of cost, for example.

Figure 7A:
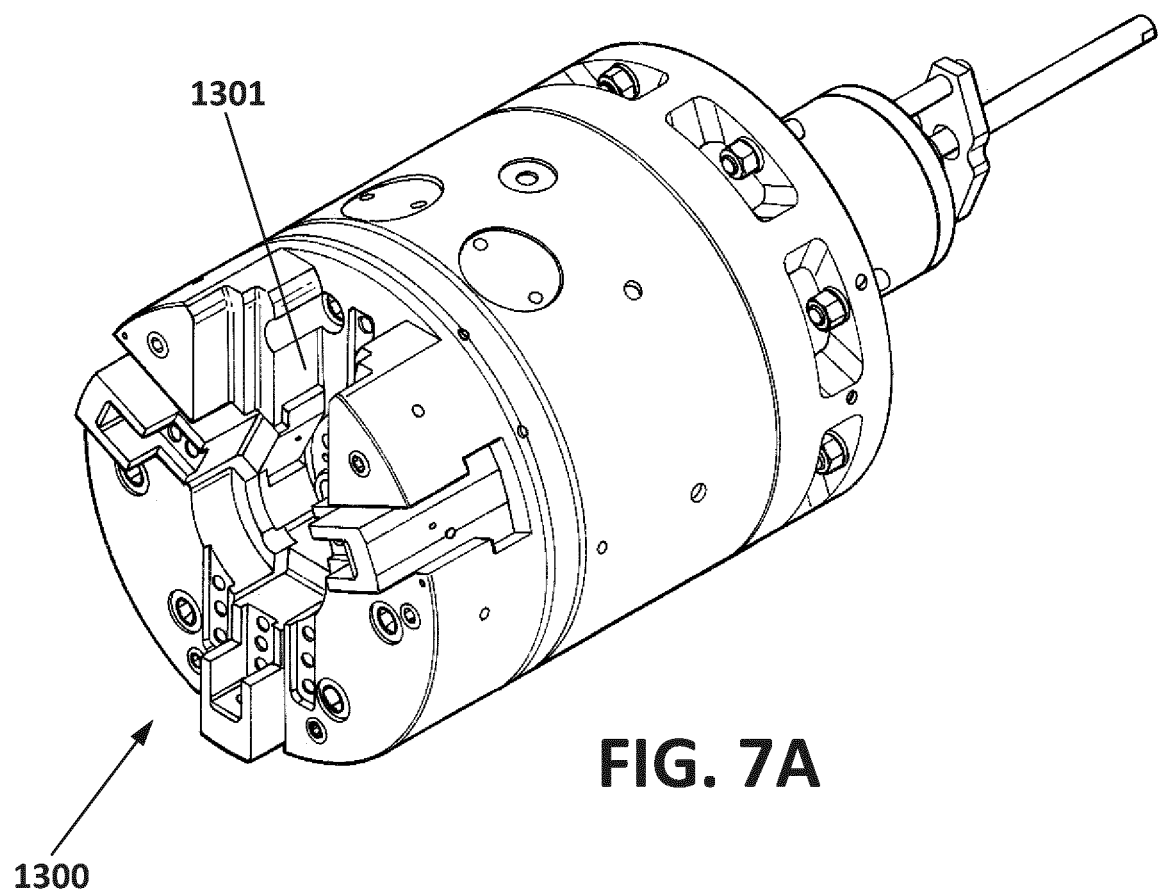
FIG. 7A schematically illustrates a first type of chuck, adapted for vertical loading of workpieces.
Figure 7B:
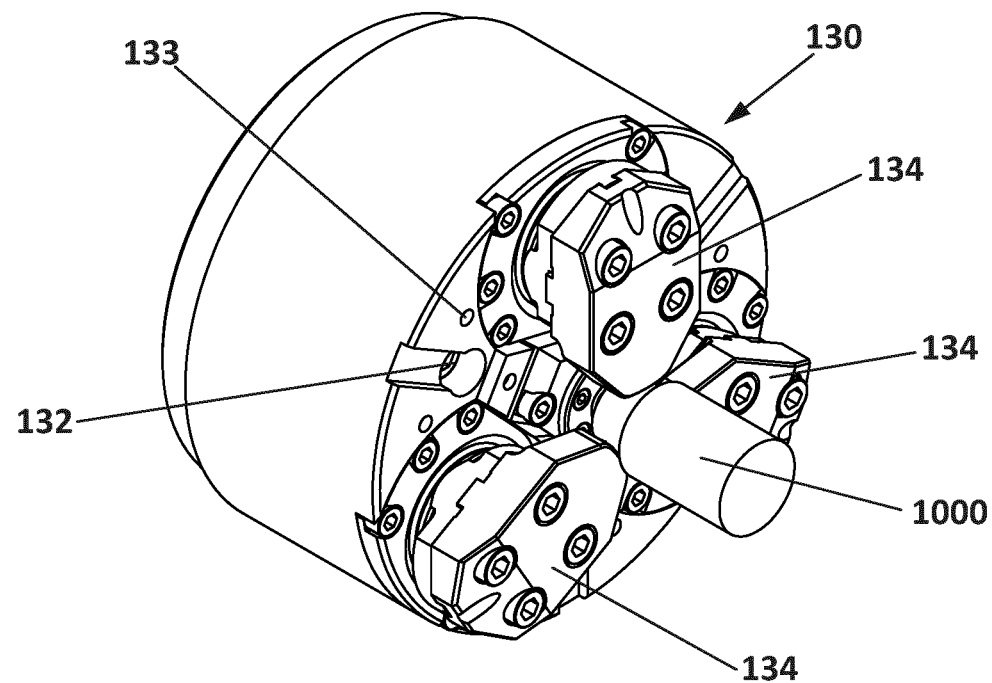
FIG. 7B schematically illustrates a second type of chuck.
Figure 7C:
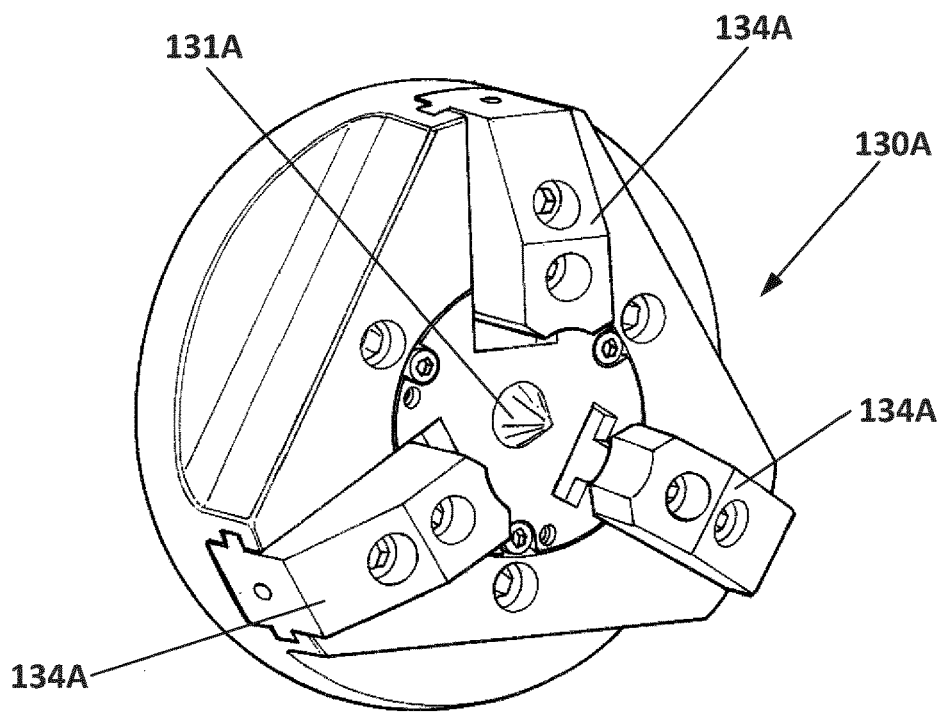
FIG. 7C schematically illustrates a third type of chuck.

FIG. 7A illustrates a chuck 1300 for a workpiece holding device adapted for vertical loading. Chucks 1300 of this kind, with a radial channel 1301 for insertion of a workpiece, are appropriate for receiving workpieces such as, for example, crankshafts by vertical loading and are well known in the art. However, although the radial channel 1301 may simplify loading, it also implies a problem as chips may enter into it during machining. This implies a risk for jamming. In some embodiments of the disclosure, it is preferred to use chucks without this kind of channel, for example, chucks 130, 130A as shown in FIGS. 7B and 7C. Here, the absence of substantial channels and cavities reduces the risk for accumulation of chips and related problems. Also, as explained below, the use of this kind of simple general-purpose chucks can involve additional advantages.

FIGS. 8A to 8C illustrate how a workpiece 1000 can be loaded into a machine in accordance with an embodiment of the disclosure. A robot or gantry loader 8 positions the workpiece so that it is axially aligned with the chucks 130, 230 of the respective workpiece holding device, as shown in FIG. 8A. Then, by relative movement between the chuck 230 and the gantry 8 (for example, by displacing the chuck 230 and its workpiece holding device 23 as schematically illustrated in FIG. 8B, or by displacing the gantry loader 8), the workpiece is positioned against a centerpin 231 of one of the chucks 230. Next, or simultaneously, by relative displacement between the workpiece and the other chuck 130 (for example, by displacing the other chuck 130 horizontally as schematically illustrated in FIG. 8C), the workpiece is placed against a centerpin 131 of the other chuck. In the illustrated embodiment the centerpin 131 is springloaded in order to absorb small potential deviations in length between crankshafts of the same model, and in order to ensure a predetermined axial clamping force. In other embodiments, both centerpins are fixed and absorption of length deviations and control of the axial clamping force may be implemented by the numerical control of the displacement of one of the workpiece holding devices or both of them. For example, precise measure and control of the torque at the Z3 and/or Z4 drives can be used to precisely control the axial clamping force.

This kind of operation can be especially easy to implement in machines according to embodiments of the disclosure, due to the NC control of the displacement of the workpiece holding devices and because the chucks can form part of relatively small and lightweight workpiece holding devices, which facilities swift movement of one or both of the workpiece holding devices, for example, to rapidly carry out horizontal movements as the ones schematically illustrated in FIGS. 8B and 8C.

Many prior art machines adapted for vertical workpiece loading involve complex chucks, for example, in line with the one of FIG. 7A, with a channel 1301 for vertical loading. Also, or alternatively, some prior art chucks may include special supports for supporting the workpiece in correspondence with the vertical loading. Such chuck and support assemblies are generally adapted to a specific type of workpiece. As explained above, this implies drawbacks in terms of the need to have specific pairs of supports or chucks available for every type of workpiece to be machined, and in terms of the time needed to adapt the machine to different types of workpieces, for example, by replacing the supports or maybe even the chucks. The present disclosure facilitates loading of workpieces involving axial clamping by numerically controlled Z-axis (Z3 and/or Z4) sliding of the workpiece holding devices, which in turn reduces the need for special supports and/or facilitates the use of more general-purpose chucks, such as the one of FIG. 7B that can serve to accommodate a wide range of workpiece types, such as a wide range of crankshaft models. Switching between one crankshaft model and another one can then be accomplished with a minimum of hardware changes (for example, by replacement of centerpins and gripping jaws, if needed), without any need for complex replacement of supports and/or of the chucks. Rather, adaptation can to a substantial extent be performed based on software changes, that is, changes in the software controlling the Z3/Z4 displacement of the workpiece holding devices during loading.

True, also in automatic machines like the ones of many embodiments of the disclosure, sometimes manual loading of workpieces is necessary. Thus, the chuck may incorporate features allowing additional workpiece supports for manual loading to be temporary attached to the chucks. In the chuck illustrated in FIG. 7B, the schematically illustrated channels and recesses 132 and threaded holes 133 can typically be used for the incorporation of such supports.

The chuck of FIG. 7B can be a so-called auto-compensating chuck, suitable for use with, for example, crankshafts that have not yet had their flange and shaft ends machined. Here, the jaws 134 that hold the end of the shaft are floating, thereby compensating for the variations in distance between the surface and the point where the centerpin is inserted.

FIG. 7C shows another type of chuck 130A that can be used in a machine according to the present disclosure. The chuck 130A has a simple design and lacks the radial channel of the chuck shown in FIG. 7A, and likewise lacks the kind of support used in many prior art machines for supporting the workpiece during loading. The chuck 130A of FIG. 7C includes a centering pin 131A and jaws 134A. However, differently from the chuck of FIG. 7B, these jaws are so-called self-centering jaws. Thus, this kind of chuck can preferably be used when the workpiece arrives at the machine with its ends already machined.

Figure 7D:
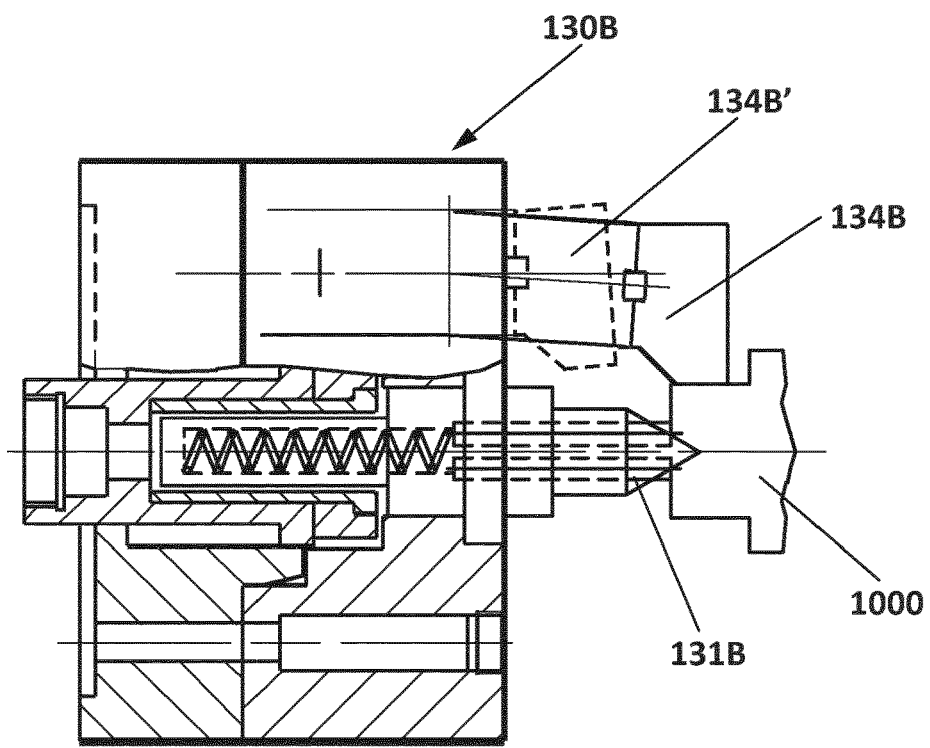
FIG. 7D schematically illustrates a fourth type of chuck.

FIG. 7D illustrates a fourth type of chuck, namely, a chuck 130B with retractible arms suitable for turn-turn-broaching. As shown in FIG. 7D, the centerpin 131B protrudes by a substantial distance from the front surface of the base of the chuck, so as to position the workpiece substantially spaced from that surface. The jaws 134B are arranged so that they can selectively apply pressure to grip the end of the workpiece as shown by jaw 134B in FIG. 7D, or be retracted to a retracted position schematically illustrated at 134B'. The jaws can thus be retracted to position 134B' when needed to allow machining of the corresponding portion of the workpiece (thus, during part of the machining, the workpiece is only gripped by jaws at one of its ends). A problem with these so-called auto-compensating chucks with retractable arms is that it is difficult to provide them with the kind of support frequently used in the art to support the workpieces during loading, as explained above. Thus, in some prior art machines, pivotable supports are arranged on the headstocks and pivoted into a position to support the workpiece when loading is to take place. This, however, substantially adds complexity to the machine. Thus, the fact that the present disclosure can contribute to make such supports unnecessary can be a further advantage.

In some embodiments, the chucks can incorporate means for detecting the presence of a workpiece, for example, in correspondence with the center-pins. For example, the centerpins or one of the centerpins can incorporate an opening allowing the passage of air, so that the presence of the workpiece can be detected by blowing.

Figure 9A:
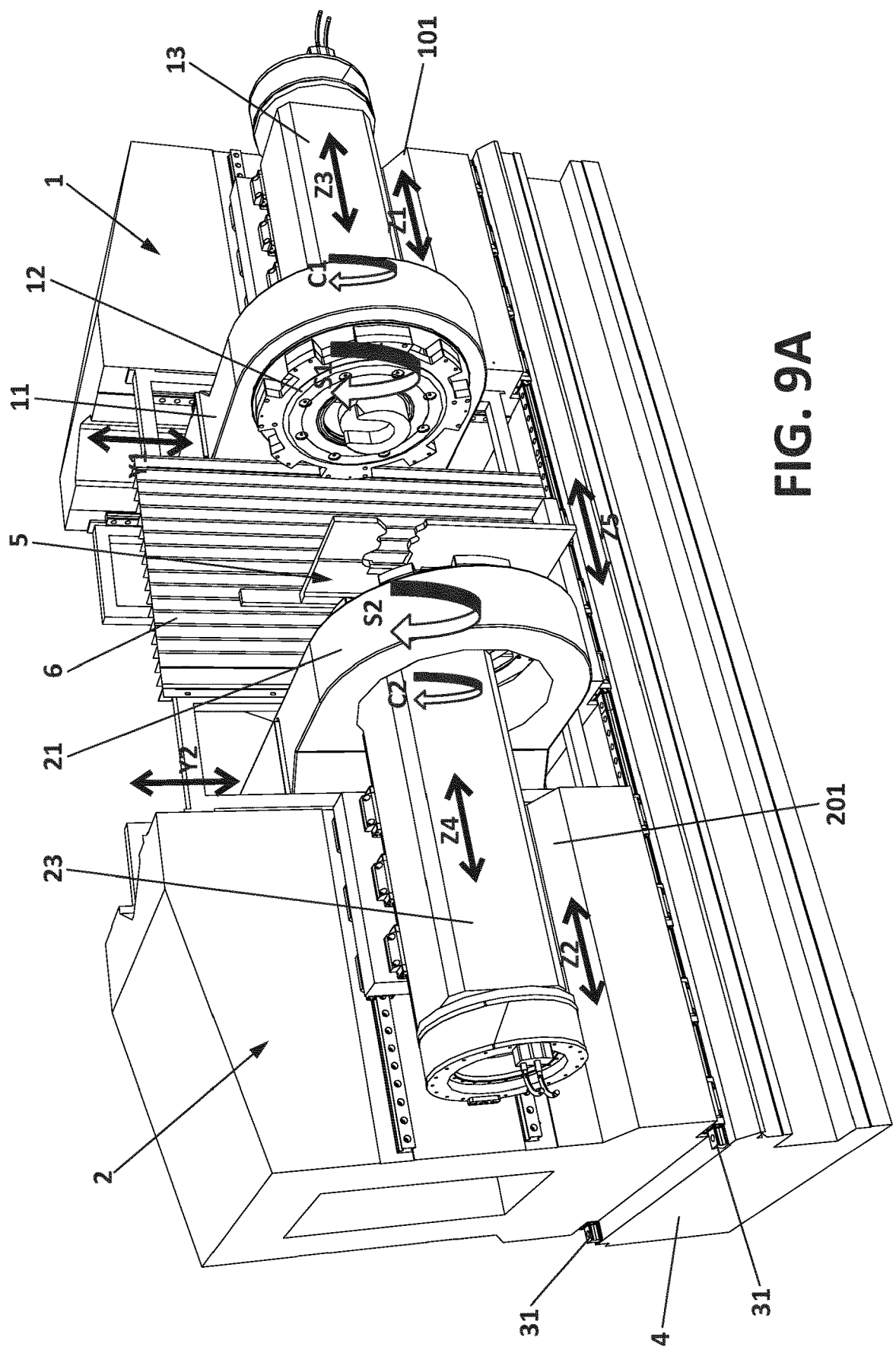
FIGS. 9A and 9B are a perspective view and a rear view, respectively, of a machine according to a second embodiment of the disclosure.
Figure 9B:
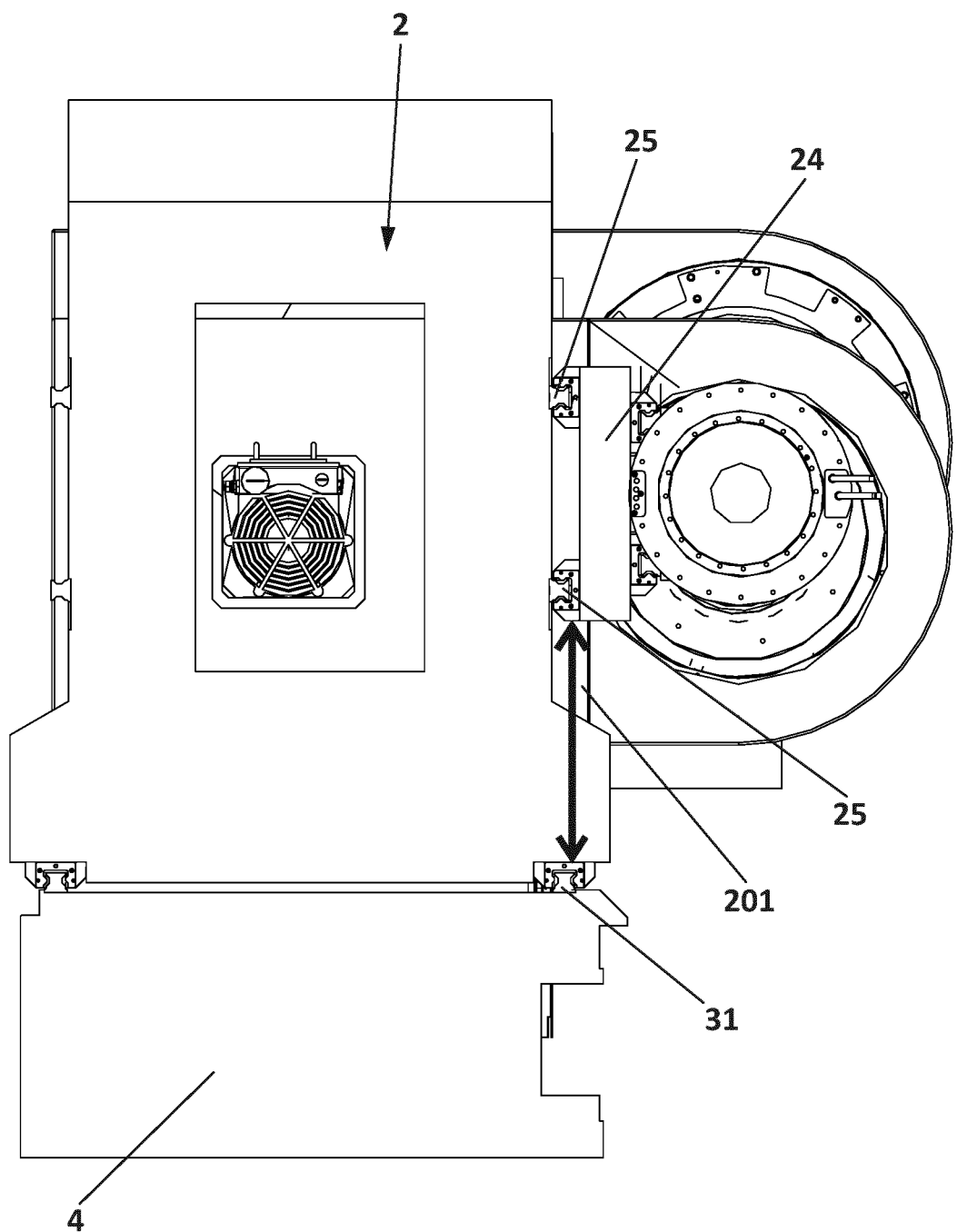

FIGS. 9A and 9B schematically illustrate a second embodiment of the disclosure. In this embodiment, the workpiece holding devices 13, 23 are placed in corresponding lateral recesses 101, 201 in the columns, so that at least part of the attachment means for attaching the respective workpiece holding device to the respective column is arranged over or within the area delimited by the rails 31 of the guide system. For example, as shown in FIG. 9B, the rails 25 by means of which the intermediate slide part 24 is attached to the column 2 are arranged above one of the rails 31 of the guide system. This kind of arrangement contributes to further enhanced stiffness. In FIGS. 9A and 9B, the drive means for the horizontal positioning of the workpiece holding devices in relation to the columns are not shown. Any appropriate placement of such drive means is within the scope of the disclosure. For example, drive means can be arranged approximately as shown in FIGS. 1 and 2.

Figure 10B:
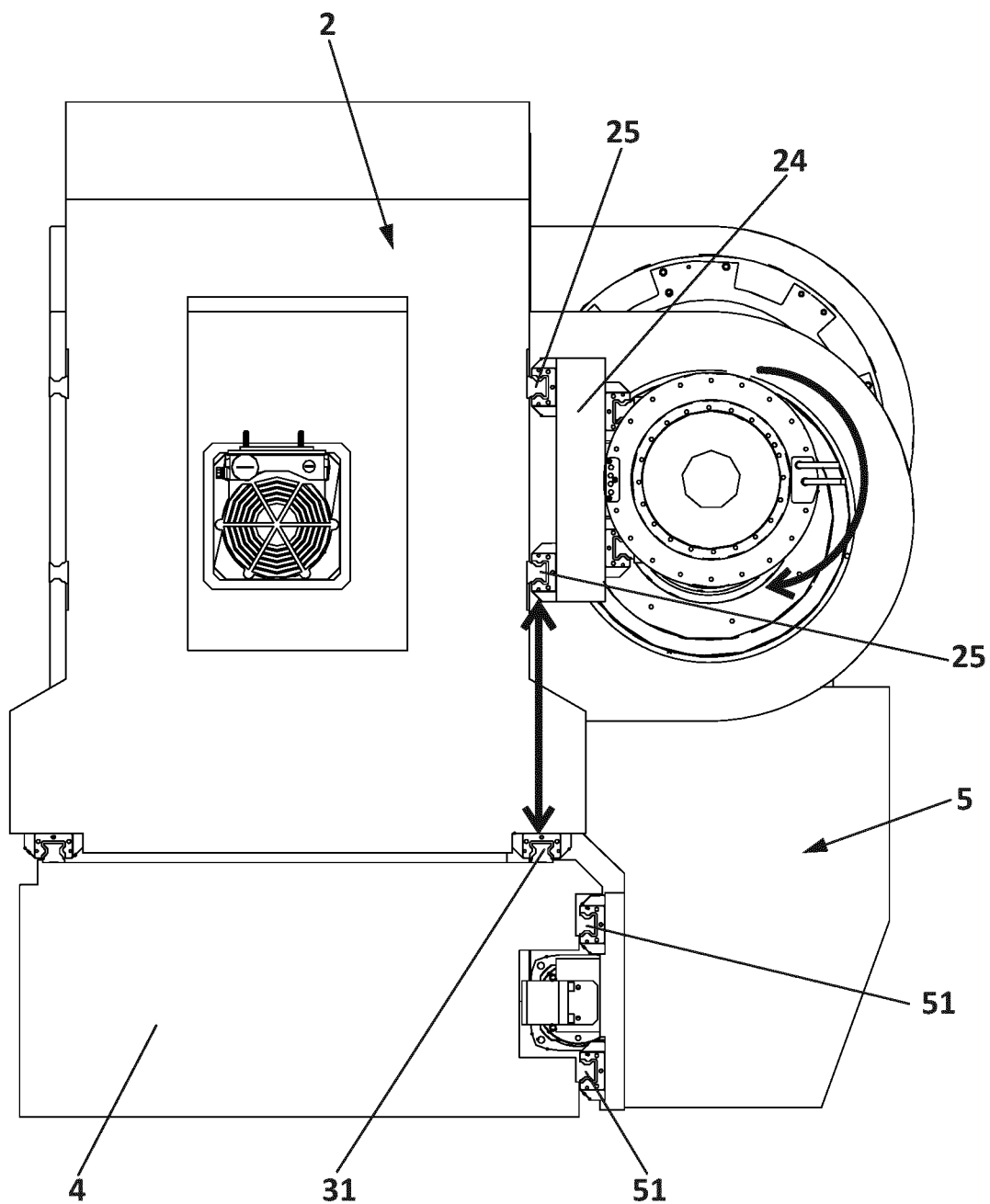

FIGS. 10A and 10B schematically illustrate a third embodiment of the disclosure, similar to the one of FIGS. 9A and 9B except that the steady-rest 5 is provided with its own guide system, comprising rails 51 arranged on a side surface of the machine bed 4. Drive means 34 for driving the steady-rest 5 in parallel with the Z axis are in this specific embodiment arranged in a recess 41 in the side of the machine bed 4. This arrangement can serve to provide even more free space between the columns 1, 2.

Figure 10C:
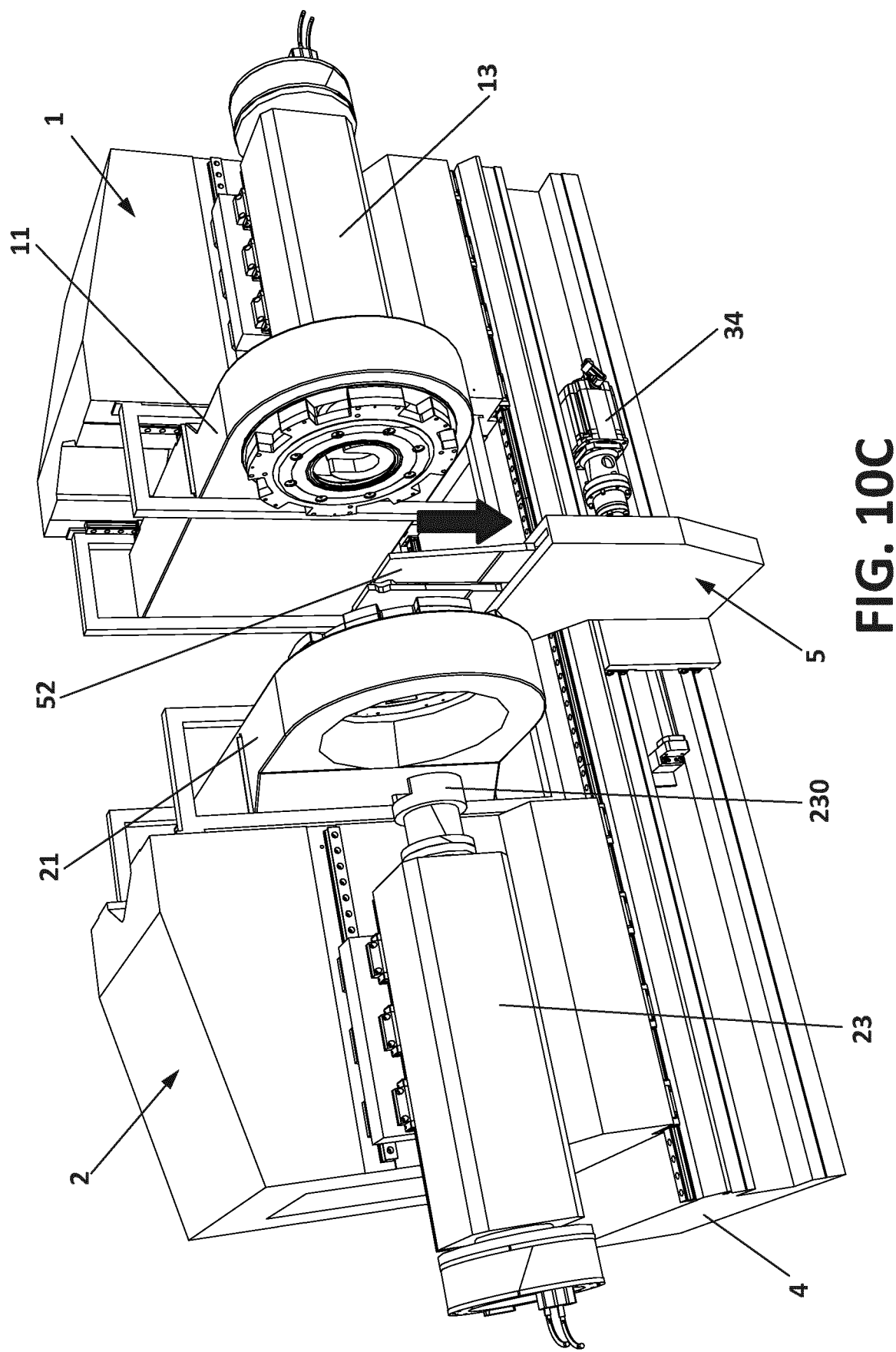
FIG. 10C-10E are perspective views of one variant of the embodiment shown in FIGS. 10A and 10B, showing how the steady-rest can be displaced between different Z-axis positions.
Figure 10D:
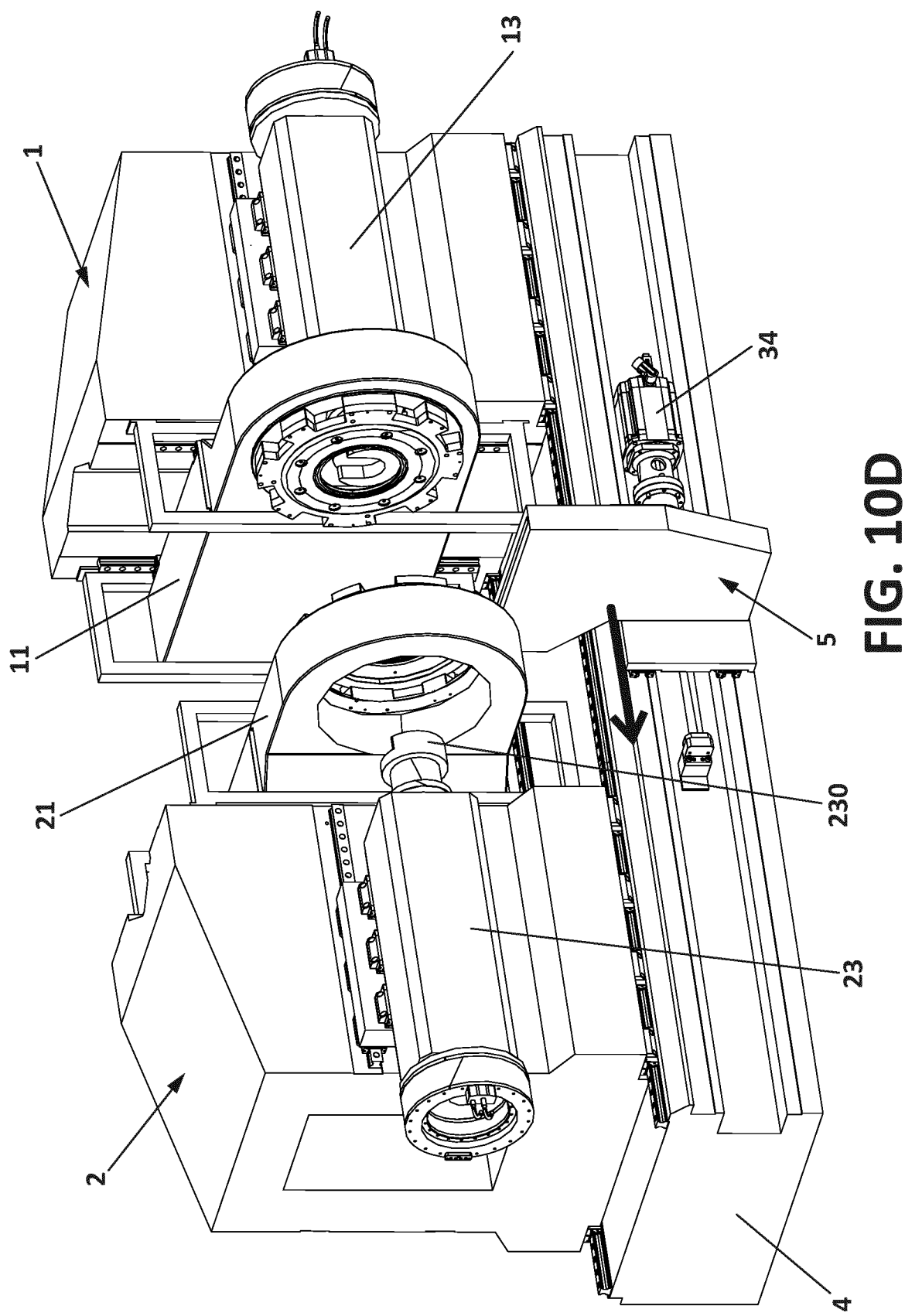
Figure 10E:
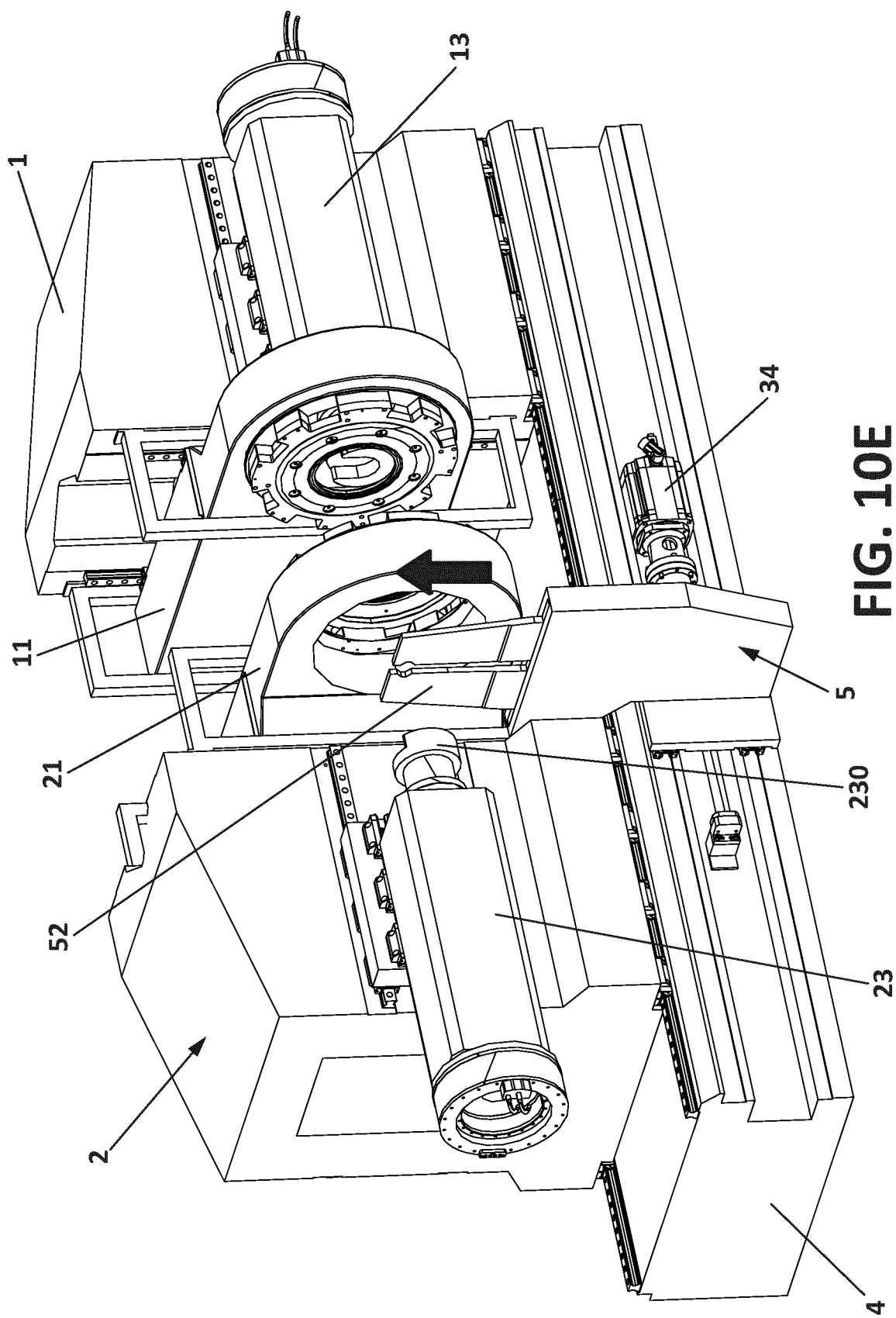

Also, this arrangement facilities displacement of the steady-rest axially beyond one or both of the tool units. For example, as schematically illustrated in FIG. 10C-10E, the steady-rest or part thereof can be arranged to be displaceable perpendicularly to the Z axis, so that the steady-rest ceases to overlap with a tool unit along the Z axis. For example, the steady-rest can comprise a gripping portion 52 that interacts with the workpiece and that is displaceable vertically so that, as schematically illustrated in FIG. 10C-10D, it can dip below the tool units 11, 21, so that the steady-rest is displaceable from a position between the tool units (as shown in FIG. 10C) to a position in which it is placed beyond one of the tool units (as shown in FIG. 10E), between a workpiece holding device 13/23 and the corresponding tool unit 11/21. For example, the position illustrated in FIG. 10E can be preferred when the tool arranged in the tool unit 21 mounted on the second column 2 is to interact with a portion of the workpiece that is remote from the end of the workpiece held by the workpiece holding device 23 mounted on the same column 2. This requires withdrawing the workpiece holding device 23 towards a retracted position, and here the steady-rest can be useful for providing support to the workpiece between the chuck 230 of the second workpiece holding device 23 and the tool mounted in tool unit 21. The arrangement of the steady-rest guided outside the guide system used for the two columns can facilitate this kind of positioning of the steady-rest, that is, the Z-axis positioning of the stead-rest selectively inside and outside the space between the tool units.

Figure 11A:
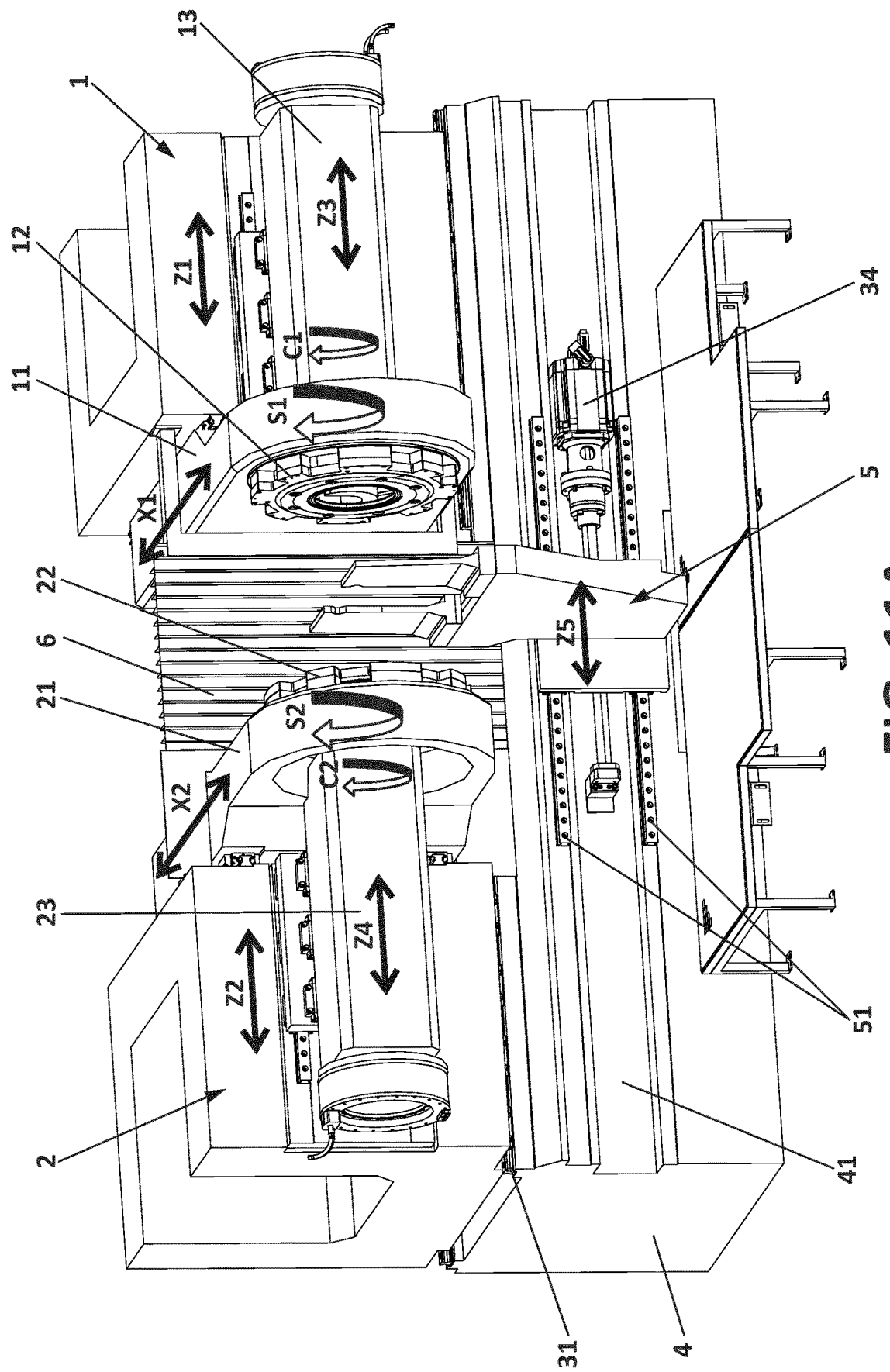
FIGS. 11A and 11B are a perspective view and a top view, respectively, of a machine according to a fourth embodiment of the disclosure.
Figure 11B:
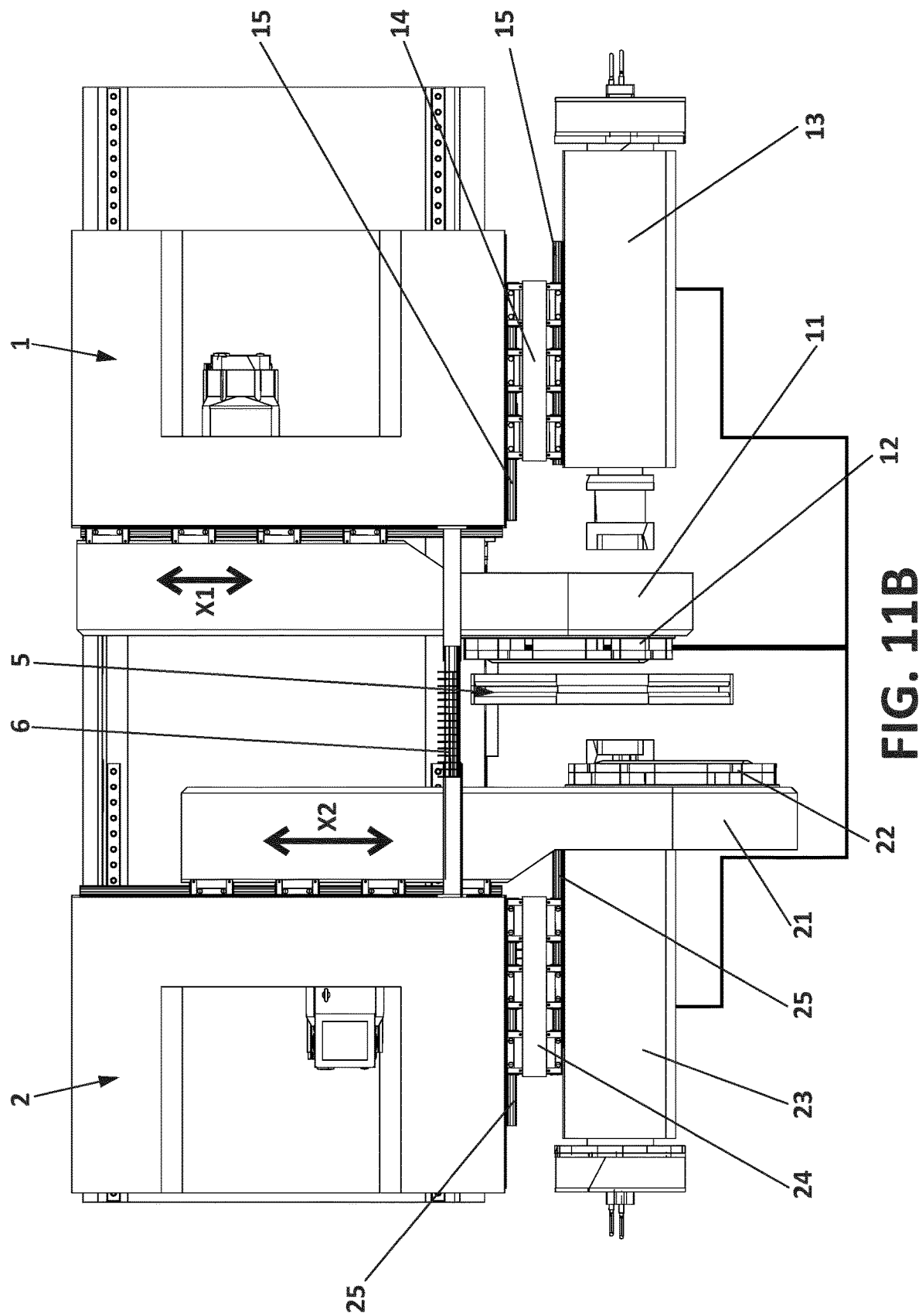

FIGS. 11A and 11B schematically illustrate a fourth embodiment, in which the tool units are arranged for movement in the horizontal direction, in parallel with the X axis of the system, according to X1 and X2 axes of the machine. This layout can serve to reduce the overall height of the machine. Additionally, and whereas movement of the tool units in the vertical direction may involve certain advantages, it may require counterweight systems such as hydraulic counterweight systems on each column to assist the motors of the drive means in the vertical displacement of the generally relatively heavy tool units. In the fourth embodiment, the displacement of the tool units is along a horizontal axis, wherefore no such counterweight systems are required.

On the other hand, FIG. 11B schematically illustrates how the telescopic attachment of the workpiece holding devices 13, 23 to the respective columns 1, 2 operates. This telescopic attachment involves the intermediate slide parts 14, 24 interacting with rails 15, 25 as described above. In FIG. 11B, the workpiece holding device 23 is in its most advanced position, whereas the workpiece holding device 13 is in its most retracted position.

Figure 12:
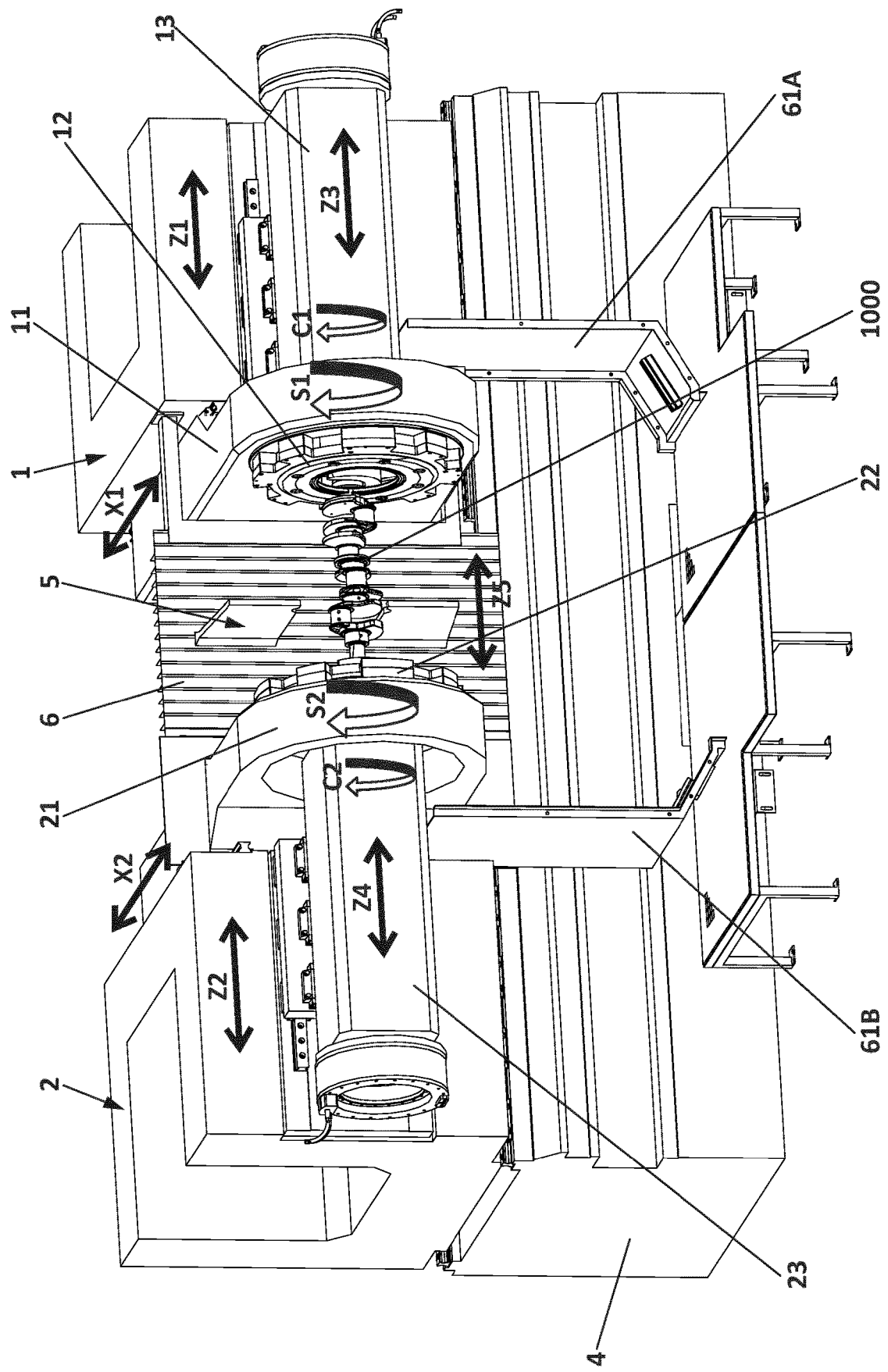
FIG. 12 is a perspective view of a machine according to a fifth embodiment of the disclosure.

FIG. 12 schematically illustrates a fifth embodiment, wherein the movement of the tool units 11, 21 in parallel with the horizontal X axis is combined with the placement of the steady-rest 5 sharing the guide system 3 with the columns 1, 2, as in the first embodiment. Schematically illustrated chip guards 61A, 61B have been included, in addition to the chip guard 6 provided to prevent chips from reaching the rails of the guide system on which the columns 1, 2 and the steady-rest 5 are arranged.

FIG. 13 schematically illustrates an example of a workpiece holding device 13 in accordance with an embodiment of the disclosure. The workpiece holding device comprises a main spindle 136 rotatably arranged on bearings 136A within a housing 137. In correspondence with a rear end of the housing, a torque motor is arranged, the torque motor comprising a stator 138 and a rotor 139. The rotor is arranged on a rear portion of the main spindle 136 and supported by rotor bearings 139A for rotation in relation to the housing, thereby driving the main spindle. For adaptation of the machine from a milling configuration to a turning or turn-turn-broaching configuration or vice-versa, the adaptation of the workpiece holding device to support the new configuration in terms of torque and/or rotational speed can easily be accomplished by replacement of the torque motor 138, 139, as schematically illustrated by double arrow A.

In all of the embodiments shown in the figures, each column supports a tool unit. This is often preferred for, for example, productivity reasons. However, in some embodiments, only one of the columns supports a tool unit. In some of these embodiments, the workpiece holding device mounted on the column that does not support a tool unit is not necessarily displaceable in relation to the column on which it is arranged. For example, if only the first column 1 supports a tool unit 11, correct positioning of the workpiece in relation to the corresponding tool 12 unit can be achieved by displacement of the second column 2 in parallel with the Z axis, and by relative displacement between the first workpiece holding device 13 and the first column 1 in parallel with the Z axis. However, it is often preferred that both workpiece holding devices are displaceable according to the Z axis in relation to their respective columns. It is also often preferred that both columns are displaceable according to the Z axis.

In this text, the term "comprises" and its derivations (such as "comprising", etc.) should not be understood in an excluding sense, that is, these terms should not be interpreted as excluding the possibility that what is described and defined may include further elements, steps, etc.

The disclosure is obviously not limited to the specific embodiments described herein, but also encompasses any variations that may be considered by any person skilled in the art (for example, as regards the choice of materials, dimensions, components, configuration, etc.), within the general scope of the disclosure as defined in the claims.

The invention claimed is:

1. A machine for machining workpieces, comprising:
   a first column and a second column, the first column and the second column being arranged facing each other according to a first horizontal axis;
   a guide system for guided displacement of at least one of the first column and the second column in parallel with the first horizontal axis;
   a first tool unit adapted for supporting and driving a first rotatable tool, the first tool unit secured to the first column for controlled displacement in relation to the first column in parallel with a second axis perpendicular to the first horizontal axis;
   a first workpiece holding device arranged on the first column, the first workpiece holding device being arranged for controlled displacement relative to the first column in parallel with the first horizontal axis;
   a second workpiece holding device arranged on the second column;
   wherein the first workpiece holding device and the second workpiece holding device are arranged for supporting a workpiece between them and for controlled rotation of the workpiece around a workpiece axis parallel with the first horizontal axis; and
   wherein the machine further comprises:
   a drive means for controlled positioning of the first column in relation to the second column, in parallel with the first horizontal axis, and
   another drive means for controlled positioning of the first workpiece holding device in relation to the first column, in parallel with the first horizontal axis.

2. The machine according to claim 1, further comprising a second tool unit adapted for supporting and driving a second rotatable tool, the second tool unit being arranged on the second column for controlled displacement in relation to the second column in parallel with the second axis and/or in parallel with a third axis perpendicular to the first horizontal axis;
   wherein the second workpiece holding device is arranged for controlled displacement in relation to the second column in parallel with the first horizontal axis,
   and wherein a further drive means is arranged for controlled positioning of the second workpiece holding device in relation to the second column, in parallel with the first horizontal axis.

3. The machine according to claim 1, wherein the first workpiece holding device is slidably attached to a side of the first column, and/or wherein the second workpiece holding device is slidably attached to a side of the second column.

4. The machine according to claim 1, wherein at least one of the workpiece holding devices is attached to the respective column through an intermediate slide part, said intermediate slide part being displaceable in relation to the respective column in parallel with the first horizontal axis, and the respective workpiece holding device being displaceable in relation to the respective intermediate slide part in parallel with the first horizontal axis.

5. The machine according to claim 1, comprising a plurality of rails for supporting a sliding movement of at least one of the workpiece holding devices in relation to the respective column.

6. The machine according to claim 1, wherein at least one of the workpiece holding devices is slidably attached to the respective column by attachment means the vertical projection of which at least partly overlaps with the guide system.

7. The machine according to claim 1, wherein the second axis is a vertical axis.

8. The machine according to claim 1, wherein the second axis is a second horizontal axis, perpendicular to the first horizontal axis.

9. The machine according to claim 1, further comprising a substantially vertically arranged chip guard, arranged for preventing chips removed from the workpiece during machining from reaching a space between the columns.

10. The machine according to claim 1, further comprising a steady-rest, wherein,
    the steady-rest is guided on the guide system, for movement in parallel with the first horizontal axis, between the first column and the second column, or
    the steady-rest is guided on an additional guide system spaced from the guide system for guided displacement of at least one of the first column and the second column in parallel with the first horizontal axis.

11. The machine according to claim 1, wherein at least one of the workpiece holding devices comprises a torque motor for rotation of the workpiece.

12. The machine according to claim 1, wherein at least one tool unit is provided with an internal milling cutter, and/or wherein the machine is adapted for machining shafts with eccentric portions.

13. A method for machining a workpiece, comprising:
    loading a workpiece into a machine according to claim 1, so that the workpiece is held by the workpiece holding devices;

positioning the workpiece in relation to at least one tool of the machine according to the first horizontal axis by displacing at least one column in parallel with the first horizontal axis, and by displacing at least one of the workpiece holding devices in relation to the respective column in parallel with the first horizontal axis;

machining the workpiece, including displacing at least the first tool unit perpendicularly to the first horizontal axis and rotating the workpiece around an axis parallel with the first horizontal axis in order for the tool to interact with different circumferential portions of the workpiece;

removing the workpiece from the machine.

14. The method of claim 13, wherein loading the workpiece into the machine comprises at least one movement of a workpiece holding device in parallel with the first horizontal axis, so as to axially clamp the workpiece between the workpiece holding devices.

15. Method for adapting a machine according to claim 1 from a first configuration to a second configuration or vice-versa, wherein the first configuration is a configuration for external milling and/or internal milling of a workpiece, and the second configuration is a configuration for turn-turn-broaching and/or turning of a workpiece, including the step of replacing at least part of a motor of at least one workpiece holding device for modification of a rotational speed characteristic of the workpiece holding device, the motor being a motor for rotation of the workpiece.

\* \* \* \* \*